(12) United States Patent
Hirt et al.

(10) Patent No.: US 6,808,054 B2
(45) Date of Patent: Oct. 26, 2004

(54) TORQUE TRANSFER DEVICE

(75) Inventors: Gunter Hirt, Kongsberg (NO); Reinhard Berger, Bühl (DE); Rolf Meinhard, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/223,079

(22) Filed: Aug. 15, 2002

(65) Prior Publication Data

US 2003/0051964 A1 Mar. 20, 2003

Related U.S. Application Data

(63) Continuation of application No. PCT/DE01/00218, filed on Jan. 18, 2001.

(30) Foreign Application Priority Data

Feb. 15, 2000 (DE) .......................................... 100 06 544

(51) Int. Cl.[7] .............................................. F16D 21/00
(52) U.S. Cl. ................................ 192/87.11; 192/48.91; 192/87.15
(58) Field of Search ........................ 192/87.11, 48.91, 192/87.15, 106 F, 87.13, 87.14, 87.16, 87.18

(56) References Cited

U.S. PATENT DOCUMENTS

| | | | |
|---|---|---|---|
| 4,527,678 A | | 7/1985 | Pierce et al. |
| 4,632,234 A | * | 12/1986 | Bardoll et al. ............. 192/3.58 |
| 5,449,329 A | * | 9/1995 | Brandon et al. ............. 477/70 |
| 5,711,409 A | * | 1/1998 | Murata ..................... 192/87.11 |
| 5,966,989 A | * | 10/1999 | Reed et al. .................... 74/331 |
| 6,397,994 B1 | * | 6/2002 | Bowen ....................... 192/48.9 |
| 6,460,425 B1 | * | 10/2002 | Bowen ........................ 74/331 |
| 6,490,944 B1 | * | 12/2002 | Heinzel et al. ................ 74/335 |

FOREIGN PATENT DOCUMENTS

| | | |
|---|---|---|
| DE | 37 14 211 A1 | 11/1988 |
| EP | 0 185 176 A1 | 6/1986 |
| GB | 2 313 885 A1 | 12/1997 |

* cited by examiner

Primary Examiner—Saul Rodriguez
(74) Attorney, Agent, or Firm—Darby & Darby

(57) ABSTRACT

The invention relates to a torque transmission device comprising a first and at least one second coupling device, of which each can be switched into different switching positions The torque transmission device also comprises a drive device, an actuating device and a drive release device or a spring device or a change-over device or a release lever device or a valve device.

43 Claims, 10 Drawing Sheets

TORQUE TRANSFER DEVICE

CROSS-REFERENCE TO RELATED APPLICATION

This is a continuation of international application Serial No. PCT/DE01/00218, filed Jan. 18, 2001, which is hereby incorporated by reference in its entirety.

TECHNICAL FIELD

The invention relates to a torque transfer device with at least one first and at least one second clutch device.

BACKGROUND

A torque transfer device is in the sense of the present invention in particular a device which under predetermined conditions can convert at least one rotational characteristic of a rotationally mounted component part such as input shaft, into an identical or different rotational characteristic of another rotationally mounted component part such as an output shaft, wherein if required these component parts can be coupled and uncoupled. More particularly it is proposed that the torque transfer device can be shifted into different shift positions wherein at least one shift position is configured so that a rotational characteristic is transferred unchanged substantially between these rotationally mounted component parts and wherein at least one shift position is configured so that a rotational characteristic is not transferred by the torque transfer device and wherein if necessary at least one shift position is provided in which a rotational characteristic is transferred in modified form.

A rotational characteristic in the sense of the present invention is in particular a characteristic which describes at least the rotational status of a rotationally movable component part such as shaft. The rotational characteristic is in particular a torque or speed.

A torque transfer device has in the sense of the present invention in particular a clutch device and/or transmission device and/or torque converter device or the like.

Devices which can transfer torque and have clutch devices are already known.

The object of the invention is to provide a torque transfer device which is designed technically different.

According to one particular aspect the object of the invention is to provide a torque transfer device with several clutches which can be actuated at low structural cost as well as cost-effectively and with high operational reliability.

According to a particular aspect the object of the invention is to provide a torque transfer device having several clutches and at least a drive device so that the required drive energy is reduced at least during predetermined shifts of the clutch devices.

According to the invention in particular a torque transfer device is provided with a drive release device which has the effect with predetermined clutch actuations of reducing the power which is transferred by a drive device for actuating the first and/or second clutch device or a relevant release lever mechanism.

The drive release device acts in particular to reduce the maximum value of the power transferred by the drive device to the release lever device of the first and/or second clutch device. This maximum value is the maximum power which has to be discharged by the drive device in the direction of the relevant release lever device in order to produce any actuation of this release lever device.

The drive release device preferably has an energy accumulator which assists both actuation of the first and second clutch device under predetermined conditions, namely particularly so that a force of the energy accumulator device is superimposed on a force transferred by the drive device to a relevant release lever device whereby the force exerted by the drive device and the energy accumulator device on the release lever device of the first and/or second clutch device is in particular a pressurised force and wherein these forces are under predetermined conditions in the same direction at the relevant release lever device.

Where necessary these forces are directed opposite at the relevant release lever device when this release lever device is loaded with substantially less force and are in the same direction when this release lever device is loaded with a larger force so that in particular the maximum drive power required is reduced.

According to the invention it is proposed that a torque transfer device has a spring device.

The spring device has the effect with predetermined actuating processes of the release lever device that an actuating force exerted on the relevant release lever device has a proportion which is transferred by the spring device, as well as a proportion which is transferred by the drive device. These proportions of the force have under predetermined conditions the same active direction wherein the first and/or second release lever device is loaded in particular with a pressurised force. Where necessary the active direction of these forces on the relevant release lever device is opposing in the case of lower forces and in the same direction in the case of larger forces wherein the resulting force acting from an actuating device on the release lever device is preferably a pressurised force.

The spring device is configured as a mechanical spring device, such as spiral spring or torsion spring, or as an electromagnetic spring device or as a hydraulic spring device or as a pneumatic spring device or in some other way.

The torque transfer device has at least a change-over device which can be switched into different switch positions.

The change-over device acts in at least a first shift position so that the drive device loads the release lever device of the first clutch device and in at least a second shift position so that the drive device loads the release lever device of the second clutch device, namely in particular each time with a pressurised force.

The preferably electronically controlled change-over device is more particularly designed to be hydraulic and/or electric and/or electromagnetic and/or pneumatic and/or mechanical.

The change-over device preferably acts in at least a third shift position such that the drive device loads neither the release lever device of the first clutch device nor that of the second clutch device.

In this third shift position the signal or force transfer stretch between the drive device and the release lever devices of the first and second clutch device is preferably interrupted or uncoupled. It is also preferred if this signal or force transfer stretch in the third shift position is not interrupted whereby the drive device does not load the release lever devices and whereby the first and/or second clutch device can relax.

According to the invention an at least in part hydraulically designed actuating device of the first and/or second clutch device has at least one valve device.

Through this valve device it is possible to control which and where necessary whether any of the release lever devices is loaded by means of hydraulic fluid.

According to the invention it is proposed that a first release lever device of the first clutch device under predetermined conditions rotates opposite a first input or output part of this clutch device. Furthermore a second release lever device of the second clutch device rotates under predetermined conditions opposite a second input part or output part of this second clutch device. The first and second release lever devices are mounted outside of the relevant input and output parts which under predetermined conditions rotate relative to the relevant release lever device, and where necessary outside of component parts which are coupled rotationally secured and non-detachable to these input and output parts and which under predetermined conditions rotate relative to the relevant release lever device.

By outside is to mean in particular axially or radially outside or that the relevant release lever device does not extend through different openings in the component part or input part or output part which are connected together by a channel or the like. By outside a component part or input or output part is to mean in particular that the relevant release lever device does not extend through a full-length opening or full-length channel or the like of the component part or input or output part.

A transmission device is in the sense of the present invention more particularly a device which can be shifted stepped or continuously as well as with or without interruption in the tractive force into different shift positions in which a different transmission ratio is provided between two rotationally mounted component parts such as shafts. The shift processes of the transmission device are in particular carried out automatically or manually or part-automatically or automatically with additional manual override facility or in some other way. The transmission device is preferably controlled electronically. The transmission device can have an automated shift transmission or a continuously variable transmission, such as a CVD, or a manual shift gear or a step-change gear or an automated transmission or an automated shift gear (ASG) or an automatic gearbox.

A clutch device is in the sense of the present invention in particular a device in which in at least two different shift positions a different ratio is provided from at least one input signal or input rotational characteristic such as torque or speed to at least one output side or output rotational characteristic wherein this device is configured in particular so that in these different shift positions the ratio of the useful power supplied to this device such as mechanical or electrical or pneumatic or hydraulic power, to the useful power discharged from this device is variable. The clutch device can be shifted in particular into at least a first shift position in which a signal or rotational characteristic is transferred substantially unchanged as well as into at least one second shift position in which a rotational characteristic is substantially not transferred, and if necessary into at least a third shift position in which a rotational characteristic is transferred restricted to a predetermined value or in part.

The clutch device is designed with or without a power branch and self-adjusting or non-self-adjusting.

A clutch device in the sense of the present invention is designed to be self-sustaining or depressed or in some other way, whereby self-sustaining is to mean that the clutch device if it is not actuated is held in a substantially closed shift position for example by means of an energy accumulator, such as a spring device and wherein depressed is to mean that the clutch device if it is not actuated is held in a substantially opened shift position for example by means of an energy accumulator, such as a spring device.

The clutch device can transfer a signal or a rotational characteristic in positive-locking or friction-locking manner or in some other way and has where necessary self-resilient clutch linings and/or a spring and/or damper device.

The clutch device is in particular designed as a start-up clutch and/or power shift clutch and/or converter lock-up clutch and has in particular a friction clutch with two or more friction faces and/or a turning set clutch and/or a multi-plate clutch and/or a magnetic powder clutch and/or a claw clutch. It is particularly preferred if the clutch device is electronically controlled and is in particular an automated clutch, preferably such as that described and supplied by the applicant under the name Electronic Clutch Management (ECM).

A torque transfer device according to the invention has in particular at least one first clutch device preferably designed and arranged as a power shift clutch device, as well as at least one second clutch device preferably designed and arranged as a start-up clutch, as well as at least a drive device and at least an actuating device.

The power shift clutch device makes it possible particularly when shifting between different gears of a transmission device to transfer torque through the transmission device so that it is possible to shift to and fro between different gears under load.

The first clutch device has at least a first input part as well as at least a first output part. The second clutch device has at least a second input part as well as at least a second output part. These relevant input parts can each be uncoupled at least in part from the associated output part so that they rotate relative to each other and they can be coupled so that torque can be transferred between same.

The input parts are in particular each coupled to a crankshaft of a motor vehicle equipped with torque transfer device and the output parts are coupled to a drive axle of this vehicle. Where necessary spring and/or damper devices are provided in these clutches.

The first and second clutch device are arranged adjoining one another or spatially separated from each other.

The first clutch device is in particular connected in parallel or in series with the second clutch device.

The first and second clutch device each have a release lever device with at least one release lever which is preferably a plate spring and which extends preferably substantially in the radial direction of a shaft.

These release lever devices can preferably each load an axially displaceable contact pressure plate of the first or second clutch device. These contact pressure plates are each arranged adjacent a clutch disc or an arrangement of several clutch discs which are associated with the same clutch device as the relevant contact pressure plate. The engagement between the friction faces of the clutch device can be increasingly released or produced through axially displacing the contact pressure plates. The contact pressure plate and/or a stop is preferably each time the input part or is coupled rotationally secured thereto. The clutch disc is preferably each time the output part or is coupled rotationally secured thereto.

These relevant release lever devices can preferably be loaded by a release bearing which is associated with the actuating device.

The release lever device of the first and/or second clutch device can each time be designed so that a pressurised force exerted by the actuating device on this release lever device causes tensile force on the contact pressure plate or such that the pressurised force exerted on the release lever device causes pressurised force on the contact pressure plate.

Preferably a pressurised force exerted by the actuating device on the release lever device of the first clutch device generates pressurised force on the contact pressure plate of the first clutch device whilst pressurised force exerted by the actuating device on the release device of the second clutch device generates tensile force on the contact pressure plate of the second clutch device.

Preferably the first clutch device is designed as a depressed clutch device and the second clutch device is designed as a self-sustaining clutch device whereby the latter is in particular caused by spring devices which load the relevant contact pressure plate of the relevant clutch device.

The different release lever devices of the first and second clutch device engage in the relevant contact pressure plate from the same side or from different sides, seen in the axial direction.

Preferably the input parts of the first and second clutch device are coupled rotationally secured to a common clutch housing or cover.

The drive device produces under predetermined conditions a drive signal in dependence on which the actuating device generates an actuating signal which is sent to the first and/or to the second clutch device or release lever device in order to actuate same.

The drive device in the sense of the present invention is in particular a device which can convert input energy form into output energy form wherein the input and output energy forms are in particular of different kind and wherein the output energy form can be used as useful energy, namely in particular in order to actuate or load component parts or the like. Preferably the drive device converts electrical energy into kinetic energy. The drive device has in particular a motor such as electric motor.

It should be pointed out that manual actuation such as for example the manual actuation of a shift lever or the like can also be a drive device in the sense of the present invention.

The torque transfer device preferably has an actuating device which is associated with the first and second clutch device so that these two clutch devices can be actuated by a common actuating device. The actuating device is in particular designed so that it has a signal or force transfer path along which a signal or force can be transferred between the drive device and the first and/or second clutch device whereby at least a part of this signal or force transfer path is used both when the first clutch device is actuated and also when the second clutch device is actuated.

The torque transfer device preferably has a transmission device which can be shifted into different shift positions in particular by means of at least a third clutch device. The third clutch device is preferably a positive locking clutch such as a claw clutch. The third transmission device is configured with or without a synchronising device. A synchronising device has at least two component parts which can be rotated opposite one another in at least a first shift position and which can be coupled so that it is possible to adapt the torque or speed between the parts which are moved relative to each other.

The transmission device preferably has several wheels through which under predetermined conditions torque can be transferred whereby at least during this torque transfer these wheels are coupled.

The wheels can be coupled so that they engage directly in each other or so that they engage indirectly in each other or in some other way. With indirect engagement between the wheels a further component part, such as contact means or the like are connected in between the wheels.

The wheels which are coupled and transfer torque can have parallel or overlapping or intersecting axles. The torque transfer can in particular take place through the outer sleeve and/or inner sleeve of these wheels.

The wheels are in particular friction wheels or toothed wheels.

The toothed wheels preferably have an evolvent spline or a cycloid spline or a circular arc spline or a drive stick spline or a Bildhaber-Novikow spline. The wheels are designed with inclined teeth or in some other way.

The toothed wheels preferably are designed as internally or externally toothed spur wheels or bevel wheels or hypoid wheels or screw wheels or worm wheels or in some other way.

The transmission device can produce different gear output speeds whilst the gear input speed is the same depending on the wheel combination which is connected into the torque flow between the gear input.

The transmission device is preferably designed so that it has a first and a second shaft on which the wheels are mounted. Different transmission stages are disposed between this first and this second shaft. These transmission stages have several toothed wheels. In each transmission stage a toothed wheel is mounted on the first shaft and a toothed wheel is mounted on the second shaft. Preferably in relation to each transmission stage a wheel mounted on the first shaft or a wheel mounted on the second shaft is mounted rotatable on this said shaft whilst the wheel mounted on each other shaft is coupled rotationally secured to this said other shaft.

The invention will now be illustrated with reference to wheels formed as toothed wheels wherein in each transmission stage these toothed wheels at least during the torque transfer between the first shaft and the second shaft engage directly in each other over this relevant toothed wheel stage and wherein where necessary at least one further transmission stage is arranged between the first and second shaft in which between the toothed wheel disposed on the first shaft and the toothed wheel disposed on the second shaft there is an intermediate toothed wheel which causes the rotational direction of the second shaft relative to the first shaft to be changed round opposite the other transmission stages. The description of the invention given by way of example with reference to these pairs of toothed wheels and the transmission stage with interposed intermediate toothed wheel is not to restrict the invention in any way.

The transmission device preferably has several transmission stages which are also termed gear transmission stages or gears and which are configured so that the toothed wheel of each transmission stage mounted rotationally movable on a shaft can be coupled rotationally secured to this shaft through a third clutch device.

Furthermore the transmission device has at least a further transmission stage which is termed in particular a power shift transmission stage and which is configured so that a toothed wheel of the transmission stage is mounted rotatable on one of the shafts, more particularly the first shaft, whilst another wheel is coupled rotationally secured to the other of these shafts, more particularly the second shaft. This wheel which is mounted rotatable on the first shaft can be coupled to this first shaft by means of the first clutch device.

The transmission device is in particular a power shift transmission.

The first clutch device is preferably a power shift clutch device which is actuated at least when a gear change is made. The power shift clutch device or power shift transmission stage thus enables in particular that even during a gear change torque is transferred between the gear input and the gear output. Where necessary the power shift transmission stage or the power shift clutch device is designed so that torque can be transferred through the power shift clutch device and through the power shift transmission stage even for longer times so that the power shift transmission stage can also undertake the function of a gear stage.

The first clutch device is preferably controlled so that at least when all third clutch devices are in an opened shift position the first clutch device is closed at least in part so that torque can be transferred through the first clutch device and power shift transmission stage. A torque transfer device according to the invention is preferably mounted in a motor vehicle which has a vehicle drive device, such as internal combustion engine and at least one vehicle drive axle which can be driven by the internal combustion engine. Torque can be transferred between the vehicle drive device and drive axle of the vehicle preferably through the first clutch device and power shift transmission stage at least when the remaining gears are not engaged or the third clutch devices are shifted in an open shift position.

The first and second clutch device are connected in parallel or in series.

A series connection of the first and second clutch device is particularly configured so that torque can only be transferred through the power shift transmission stage between the first and second shafts when the first clutch device and the second clutch device are shifted in a closed shift position, and through one of the gear transmission stages which are not power shift transmission stages torque can then be transferred when the first clutch device is shifted in an open shift position and the second clutch device is shifted in a closed shift position.

A parallel arrangement of the first and second clutch device is particularly configured so that torque can be transferred between the first and second shaft through the second clutch device even when the first clutch device is opened and vice versa.

The actuating device preferably has a hydraulic arrangement. In this hydraulic arrangement force of the drive device and at least one release lever device of the first or second clutch device is preferably transferred by means of hydraulic fluid such as hydraulic oil or the like.

The actuating device preferably has at least one piston/cylinder unit wherein the cylinder is preferably filled at least in part with hydraulic fluid in at least one shift position.

The piston/cylinder unit can be designed so that the piston or a piston device divides or can divide the cylinder into several chambers so that the piston is axially displaceable in the cylinder and during axial displacement causes the volume of just one chamber of the cylinder unit to be changed.

Preferably the actuating device has at least one master piston cylinder unit with a master piston and a master cylinder as well as at least a slave piston cylinder unit with a slave piston and a slave cylinder. The master piston can be loaded by the drive device and cause fluid disposed in the master cylinder to be loaded.

The slave cylinder is preferably connected to the first and/or second slave cylinder through an arrangement of at least one hydraulic fluid pipeline.

The hydraulic device of the actuating device preferably has at least one valve device.

In a particularly preferred way a valve device of this kind can be shifted in different shift positions and in particular interrupt a connection between the master cylinder and the first slave cylinder and/or the master cylinder and the second slave cylinder in at least one shift position.

Particularly preferred the slave cylinder and master cylinder are arranged relative to each other so that displacement of the master piston through hydraulic fluid can cause displacement of the first and/or second slave piston whereby in the corresponding pipelines containing hydraulic fluid there is where necessary a valve device which can be shifted into different shift positions.

According to a preferred embodiment of the invention the actuating device has at least a volume compensating container. This volume compensating container is in particular designed so that it can take up hydraulic fluid wherein this hydraulic fluid which is in the volume compensating container is loaded with a predetermined pressure. The hydraulic fluid is preferably loaded in this volume compensating container with atmospheric pressure or is substantially pressure-free. It is also particularly preferred if where necessary according to a predetermined characteristic the hydraulic fluid is loaded with a different pressure in the volume compensating container. To this end spring elements are provided where necessary which by way of example load a piston which in turn acts on the hydraulic fluid disposed in the volume compensating container. It is also preferred if for example a constant pressure is exerted on this hydraulic fluid for example through a mass which loads the hydraulic fluid in the volume compensating container.

According to a preferred embodiment of the invention the valve device disposed inside the actuating device has an a/b-way valve wherein a and b are each natural numbers which are greater than 1 and wherein a is the number of connections of the valve device and b is the number of shift positions in which the valve device can be shifted. According to a preferred embodiment of the invention the valve device has at least one a/b-way seat valve device.

Preferably several a/b-way valves are provided with a different or the same number of connections or shift positions in the actuating device.

The valve device is preferably actuated electromagnetically. It is further preferred if several valve devices can be shifted by just one magnet.

The invention will now be explained in further detail with reference to an a/b-way valve device wherein instead of this a/b-way valve device a different valve device or a combination of valve devices or an a/b-way seat valve device can be provided.

The a/b-way valve device has different connections.

The a/b-way valve device preferably has at least a first slave connection. In the sense of the present invention a first slave connection is a connection of the a/b-way valve device which is connected to the first slave cylinder through at least a hydraulic pipeline.

The a/b-way valve device preferably has at least a second slave connection which is or can be connected to the second slave cylinder through at least one hydraulic pipeline.

The a/b-way valve device preferably has a master connection which is or can be connected to the master cylinder through at least one hydraulic line.

Preferably the a/b-way valve device has at least a volume compensating connection wherein this volume compensating connection can be or is connected to the volume compensating container through at least a hydraulic line.

According to the invention a hydraulic pipeline can be designed so that between one end and the other end of this hydraulic line there are no further structural elements such as valves or the like and/or so that between these ends of the hydraulic pipeline there are branch pipes or the like so that further component parts such as valves or the like are arranged between these ends of the hydraulic pipeline.

The actuating device preferably has at least one energy accumulator device or spring device. This spring device is more particularly configured and arranged so that it loads the master piston, namely preferably in a direction which produces pressurised force on the release lever device of the first clutch device and/or second clutch device.

Preferably the spring force of the spring device of the actuating device opposes the spring force of a spring of the first or second clutch device when the actuating device loads the release lever device of this first or second clutch device.

The spring device of the actuating device which more particularly loads the master piston is preferably arranged and configured so that the force exerted by the spring device on the release lever device has the same active direction on the release lever device as the force produced by the drive device on this release lever device, namely at least when the drive device loads this release lever device with increasing pressure.

According to a preferred embodiment of the invention the first and/or second slave cylinder and/or master cylinder and/or hydraulic line mounted inside the hydraulic line assembly of the actuating device has at least one snifting bore. This snifting bore is connected to the volume compensating container through a hydraulic line or a hydraulic line assembly, namely in particular through a pipeline in which there is no a/b-way valve device. Preferably only the master cylinder has a snifting bore.

This snifting bore preferably extends as a full-length bore through the cylinder sleeve.

Preferably a snifting borer is arranged in a piston so that in at least a first axial position of a piston guided in this cylinder the snifting bore opens into a first chamber of this cylinder and in at least a second piston position this piston closes the snifting bore and where necessary in at least a third piston position the snifting bore opens into a second chamber of this cylinder.

According to a preferred embodiment of the invention at least one spring device loads the first slave piston. Preferably at least a spring device loads the second slave piston. It is particularly preferred if the spring force of this spring device which loads the slave piston is less than the spring force of a spring device which loads the master piston.

The spring force of the spring device which loads the first and/or second slave piston can be opposite the spring force of the spring device which loads the master piston, or can act in the same direction.

Between the first and/or second slave cylinder and the volume compensating container, volume compensation can in particular be prevented or allowed when this slave cylinder and master cylinder are hydraulically uncoupled, thus a hydraulic pipeline which is provided where necessary to connect these cylinders is interrupted through a valve device or the like.

Preferably in at least one valve position of the valve device a master connection is coupled hydraulically to the first and/or second slave connection of the valve device so that the master piston can load this slave piston through the hydraulic fluid.

Preferably in at least one valve position of the valve device the first and/or second slave connection of the valve device is coupled hydraulically to the volume compensating connection of the valve device so that a volume and/or pressure compensation is possible between a chamber of this slave cylinder and the volume compensating container.

In a particularly preferred way the valve device in one valve position connects the first slave connection to the master connection and the second slave connection to the volume compensating connection so that the master piston can load the first slave piston through the hydraulic fluid and enables volume or pressure compensation between a chamber of the second slave cylinder and the volume compensating container.

Preferably in one shift position of the valve device the second slave connection is connected to the master connection and the first slave connection is connected to the volume compensating connection so that the master piston can load the second slave piston through the hydraulic fluid and enables volume and/or pressure compensation between a chamber of the first slave cylinder and the volume compensating container.

Preferably at least one hydraulic fluid pipe extends from the volume compensating connection of the valve device to the volume compensating container whereby at least one hydraulic fluid pipeline branches off from this hydraulic fluid pipe and opens into a snifting bore of the master cylinder.

It is particularly preferred if the valve device of the actuating device is designed so that in a first shift position the master cylinder is connected to the first slave cylinder and the second master connection is closed so that no hydraulic fluid can be supplied from the second master cylinder through this valve device or vice versa. Preferably a second valve position is provided in which the master cylinder is connected to the second slave cylinder whereby the first master connection is closed.

According to a particularly preferred embodiment of the invention the first slave cylinder is connected to the first slave connection of the valve device and the second slave cylinder is connected to a second slave connection of the valve device. Two further connections of the valve device are each connected to the master cylinder. It is also preferred if only one further connection is connected to the master cylinder whereby a pipeline region branches off extending from this connection into the inside of the valve device. In a first shift position of this valve device the connection between the master cylinder and the chamber of the first slave cylinder is interrupted whilst the master cylinder is connected to the second slave cylinder so that the master piston can load the second slave piston.

In a second shift position the master cylinder is connected to the first slave cylinder and the connection between the master cylinder and second slave cylinder is interrupted. In a third shift position which is in particular an intermediate shift position between the first and second shift position both the first slave cylinder and the second slave cylinder are each connected to the master cylinder. The master cylinder has a snifting bore which is connected to the volume compensating container through a pipeline.

In the first or second shift position of the valve device the master piston loads the first or second slave piston respectively. If there is a shift between these shift positions preferably first the intermediate shift position or third shift position is connected. In this shift position the pressure in the chamber of the slave cylinder whose piston was last loaded by the master piston has the effect of forcing back the master piston, namely so that it travels through the snifting bore disposed in the master cylinder and enables volume compensation or pressure compensation between the first slave cylinder and the volume compensating container as well as the second slave cylinder and volume compensating container so that the same pressure is set each time in one chamber of the first slave cylinder and in one chamber of the second slave cylinder and in one chamber of the master cylinder and in the volume compensating container as well as the corresponding pipelines whereby in particular the result is that the first clutch device and the second clutch device are moved into their basic position.

It can then in turn be possible to shift into first or second shift position of the valve device so that the master piston loads the first or second slave piston depending on the shift position. Where necessary this movement of the slave piston is assisted by the drive device.

Preferably the first and/or second release lever device has an axial projection which extends preferably in the axial direction of the clutch discs or shaft. This projection is preferably supported on the release lever which is aligned in the radial direction.

An axial projection preferably extends past a clutch disc so that in particular the clutch disc is mounted between the ends of the axial projection seen in the axial direction of this clutch disc. It is particularly preferred if this axial projection is mounted radially outside of this clutch disc.

The axial projection preferably extends through a full-length opening provided in a clutch housing or clutch cover. The through opening or its longitudinal axis is preferably aligned in the radial or axial direction, in relation to the clutch discs. The through opening is formed as an oblong hole or circular hole or as a slit or in some other way.

The axial projection preferably extends through at least a full-length opening in a component part which contacts a contact pressure plate and is supported on same when required. This component part is in particular preferably formed by a spring device which extends preferably from a clutch cover to a contact pressure plate and holds the contact pressure plate in an opened or closed position in the non-actuated state of the clutch device.

The axial projection preferably has at least one full-length opening through which a component part such as a spring device or the like extends.

The axial projection is preferably associated with a first or second clutch device and is arranged substantially radially outside of the other of these two clutch devices.

The contact pressure plates of the first and second clutch device preferably have a different external diameter. The axial projection preferably extends radially outside of the contact pressure plate which has the smaller diameter. The axial projection preferably extends radially inside the contact pressure plate which has the larger outer diameter or substantially at the point in the radial direction which corresponds to the outer diameter.

The torque transfer device according to the invention as well as the control device according to the invention are preferably used in a motor vehicle.

By the term of "control" is meant in the sense of the present invention in particular "regulate" and/or "control" in the sense of the DIN. The same applies to the terms derived from the term "control".

The invention will now be explained in further detail with reference to embodiments which are given by way of example and are in no way limiting.

IN THE DRAWINGS:

FIG. 1 shows a first embodiment of the invention given by way of example in diagrammatic form.

Figure 1:
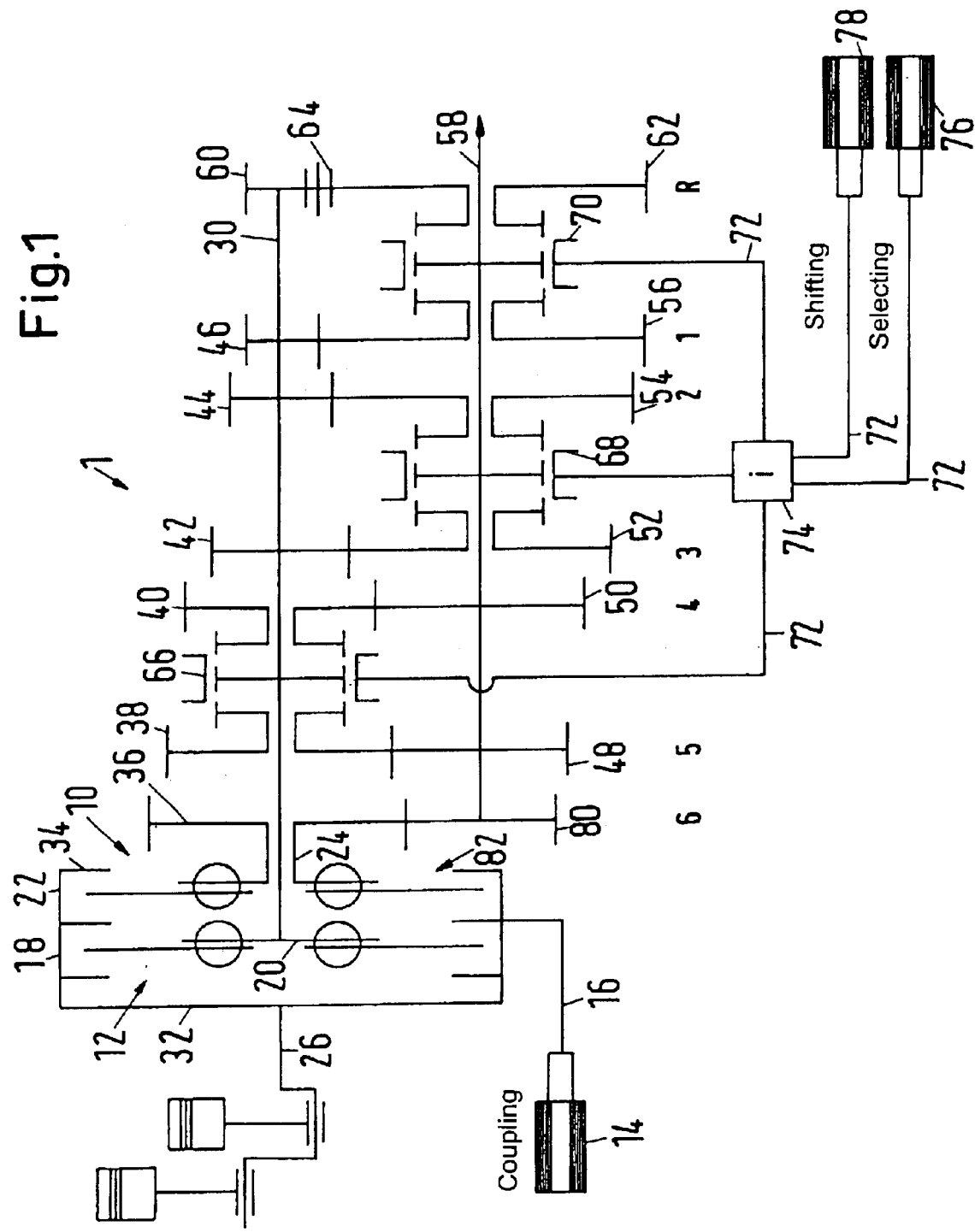
FIG. 1 shows a diagrammatic part sectional view of a first embodiment of the invention given by way of example.

The torque transfer device 1 has a first clutch device 10 and a second clutch device 12.

The first 10 and second clutch device 12 have a drive device 14 as well as an actuating device 16 which is coupled hereto and which is shown in marked diagrammatic form. The drive device 14 can load the actuating device 16 which in turn can cause the first 10 and second clutch device 12 to be shifted into different shift positions.

The shift positions of the second clutch device 12 are designed so that in at least one first shift position torque can be transferred between the input part 18 of the second clutch device 12 and the output part 20 of the second clutch device 12, and in at least a second shift position the input part 18 is uncoupled from the output part 20 so that no torque can be transferred between these parts 18, 20. Where necessary in at least a third shift position of the second clutch device 12 a restricted torque can be transferred between the input part 18 and the output part 20. This means in particular that the torque introduced into the second clutch device 12 is completely transferred if the torque introduced into this second clutch device 12 is less than a predetermined limit torque. If the torque introduced into the second clutch device 12 is greater than this predetermined limit torque then only the predetermined limit torque is transferred. The second clutch device 12 is in particular a friction clutch so that in the event that in one of the third shift positions the torque introduced is greater than a predetermined limit torque then the second clutch device 12 slips.

The shift positions of the first clutch device 10 are designed so that in at least a first shift position an input part 22 of the first clutch device 10 is uncoupled from an output part 24 of the first clutch device 10 so that between these parts 22, 24 no torque can be transferred through the first clutch device 10 and in at least a second shift position restricted torque can be transferred through the first clutch device 10. This means in particular that torque introduced into the first clutch device 10 is completely transferred if the torque introduced into this first clutch device 10 is less than a predetermined limit torque. If the torque introduced into the first clutch device 10 is greater than this predetermined limit torque then only the predetermined limit torque is transferred. Where necessary the first clutch device 10 can be shifted into at least a third shift position in which torque is completely transferred between the input part 22 and the output part 24.

The first clutch device 10 is in particular a friction clutch so that in the event that in one of the third shift positions the torque introduced is greater than a predetermined limit torque the first clutch device 10 slips.

The first 10 and/or second clutch device 12 have in particular, although not shown in further detail, a contact pressure plate as well as where necessary a stop coupled to the input part 18. In the axial direction between this stop and this contact pressure plate there is at least one clutch disc which is coupled to the output part 20 or 24 or is the actual output part 20 or 24. More particularly a clutch disc of the first 10 and/or second clutch device 12 is coupled on the output side through a spring and/or damper device to an adjoining component part and can transfer torque through this spring and/or damper device under predetermined conditions. The friction faces or friction linings of the first 10 and/or second clutch device 12 are self-resilient where required.

The second clutch device 12 is in particular a self-sustaining start-up clutch so that the second clutch device 12 is shifted substantially in a closed shift position when it is not actuated or is not loaded by the actuating device.

The first clutch device 10 is in particular a depressed power shift clutch which means that the first clutch device 10 is shifted substantially in an opened shift position when it is not actuated or is not loaded by the actuating device 16.

In the embodiment according to FIG. 1 the first 10 and second clutch device 12 are connected in parallel, which means in particular that the first clutch device 10 can transfer torque in an at least partly closed shift position even when the second clutch device 12 is opened, and vice versa.

The input part 18 of the second clutch device 12 is coupled to a crankshaft 26 of a motor vehicle which is loaded by an internal combustion engine whose cylinders 28 are shown diagrammatically.

The output part 20 of the second clutch device 12 is coupled to a first shaft 30—where necessary through a spring and/or damper device—and can transfer torque at least in part to this first shaft 30.

The input part 22 of the first clutch device 10 is coupled to a crankshaft 26 of a motor vehicle. More particularly the input part 22 of the first clutch device 10 is connected rotationally secured to a clutch housing 32 or clutch cover 34 which is coupled rotationally secured to the input part 18 of the second clutch device.

The output part 24 of the first clutch device 10 is coupled rotationally secured to a wheel 36 of a power shift transmission stage which will be described in further detail below. This wheel 36 of the power shift transmission stage which is in particular an externally toothed spur wheel is mounted on the first shaft 30. Where required the output part 24 of the first clutch device 10 is coupled through a spring and/or damper device to the wheel 36 of the power shift transmission stage and can transfer torque at least in part to this wheel 36.

Several wheels 38, 40, 42 44, 46 are mounted on the first shaft 30 and are each associated with a transmission stage or gear stage and are here externally toothed spur wheels. Each of these wheels 38, 40, 42, 44, 46 engages in a wheel 48, 50, 52, 54, 56 which is mounted on a second shaft 58. The second shaft 58 is mounted parallel to the first shaft 30. The wheel pairings 38–48, 40–50 and 42–52, 44–54, 46–56 are each associated with one transmission stage or gear shift namely preferably in this sequence the fifth to first gears.

In the embodiment according to FIG. 1 these transmission stages or gear stages are mounted on the first 30 and second shaft 58 so that the highest of these gear stages faces the second clutch device 12 or the internal combustion engine (not shown) and the transmission stage of the first gear is arranged on the output side or faces a drive axle of a motor vehicle having the torque transfer device 1 wherein the remaining gear stages are arranged in their numbered sequence between the first and fifth gear stage.

Each of these gear stages 38–48, 40–50, 42–52, 44–54, 46–56 has a wheel 38, 40, 52, 54, 56 which is mounted rotatable on the first 30 and second shaft 58 respectively. Another wheel or the other wheel 48, 50, 42, 44, 46 of these transmission stages is mounted rotationally secured on each other of these shafts 30, 58. These rotationally mounted wheels 38, 40, 52, 54, 56 are in particular mounted on the first 30 or second shaft 58 so that adjoining each of these rotationally mounted wheels 38, 40, 52, 54, 56 there is at least one further rotatably mounted wheel 38, 40, 52, 54, 56.

A further wheel 60 mounted on the first shaft 30 and which is in particular an externally toothed spur wheel as well as a further wheel 62 which is mounted on the second shaft 58 and is in particular an externally toothed spur wheel is associated with a further transmission stage or gear stage.

A further wheel 64 which is likewise an externally toothed spur wheel is connected in between these toothed wheels 60, 62 whereby the wheel 60 engages in the wheel 64 and the toothed wheel 64 engages in the toothed wheel 62. Through this interposed toothed wheel 64 the rotational direction of the wheels 60, 62 is identical or with the same rotational direction of the first shaft 30 the rotational direction of the second shaft 58 when the transmission stage 60-64-62 is connected is opposite compared to the transmission stages 38–48, 40–50, 42–52, 44–54, 46–56.

The transmission stages or gear transmission stages 38–48, 40–50, 42–52, 44–54, 46–56 are in particular forward gears whilst the transmission or gear stage 60-64-62 is reverse gear. The power shift transmission stage mentioned below preferably likewise acts as a forward gear.

The wheel 62 of the reverse gear stage or transmission stage 60-64-62 is mounted rotatable on the second shaft, and the wheel 60 is mounted rotationally secured on the first shaft 30.

Third clutch devices 66, 68, 70 are mounted adjacent the wheels 38, 40, 52, 54, 56, 62 of the gears or gear stages or transmission stages 38–48, 40–50, 42–52, 44–54, 46–56 or 60-64-62 mounted rotatable on the first 30 or second shaft 58 respectively, and can each be shifted into different shift positions. By means of these third clutch devices 66, 68, 70 the wheels 38, 40, 52, 54, 56, 62 mounted movable on the first 30 and second shaft 58 can be coupled rotationally secured to the relevant shaft 30, 58.

In the illustration according to FIG. 1 the wheels 38, 40, 42, 54, 56, 62 mounted rotatable on the first 30 and second shaft 58, as well as the third clutch devices 66, 68, 70 are each designed or arranged so that the clutch devices 66, 68, 70 are each mounted between two rotatably mounted wheels of the transmission stages and in the different shift positions can couple each one of these adjoining wheels to the relevant shaft 30, 58 whereby these third clutch devices 66, 68, 70 can be shifted in particular into a further shift position in which they couple none of the adjoining wheels 38, 40, 52, 54, 56, 62 mounted rotatable on the first 30 and second shaft 58 respectively, to the said first and second shaft 30, 58.

It is thus proposed in particular that the clutch devices 66, 68, 70 are each associated with two wheels of the transmission stages. The third clutch devices 66, 68, 70 are actuated or shifted by an actuating device 72 which has where necessary a transmission stage 74. The actuating device 72 is loaded by a drive device which has a first electric motor 76 and a second electric motor 78.

The actuating device 72 is designed so that in the event of load through the first electric motor 76 the actuating device can be shifted into a shift position from which a predetermined gear stage can be shifted each time, and this predetermined gear stage can be engaged through the second electric motor 78.

Preferably the actuating device 72 or a predetermined component part (not shown) of the actuating device 72, such as a shift shaft, when shifting into a predetermined shift position from which a gear can be engaged, during the so-called selection, on the one hand, and when shifting into a predetermined gear stage, the so-called shifting, on the other hand, is moved or loaded in different directions. These different movement or load directions are in particular each caused by one of the different electric motors 76, 78. These different movement or load directions can be for example in the case of a shift shaft such that the latter is moved or loaded in the circumferential direction on one hand and in the axial direction on the other.

Between the first shaft 30 and the second shaft 58 there is a further transmission stage which has a wheel 36 mounted rotatable on the first shaft, and here an externally toothed spur wheel, as well as a wheel 80 mounted rotationally secured on the second shaft 58. This transmission stage 36–80 is termed power shift transmission stage. The transmission ratio of the power shift transmission stage is designed so that it is greater than the transmission ratios of the gear stages. The power shift transmission stage 36–80 is mounted on the drive side of the gear transmission stages 38–48, 40–50, 42–52, 44–54, 46–56, 60–62.

According to one aspect the torque transfer device 1 according to the invention functions as follows:

If a motor vehicle equipped with torque transfer device 1 according to the invention is operated in a predetermined gear stage and a shift process between different gears has not be initiated or has terminated, thus between the first and second shaft torque is to be transferred through the transmission stage 38–48 or 40–50 or 42–52 or 44–54 or 46–56 or 60–62, then the second clutch 12 is in a closed shift position and the first clutch device 10 is in an opened shift position. Thus torque is transferred from the crankshaft 26 to the input part 18 of the second clutch device 12. Since the second clutch device 12 is in a closed shift position this torque is passed on to the first shaft 30, at least in part.

One of the third clutch devices 66, 68, 70 connects one of the rotatably mounted wheels 38, 40, 52, 54, 56, 62 rotationally secured to the first 30 or second shaft 58. The rest of these third clutch devices 66, 68, 70 are shifted in an open shift position so that the remaining rotatably mounted toothed wheels can turn on the shaft 30, 58.

In the following it is assumed by way of example that the starting transmission stage is thus a transmission stage from which at a later point in time a shift is to be made into a different transmission stage which is the transmission stage of the first gear so that torque is transferred from the first shaft 30 though the wheel 46 to the wheel 56 and from this wheel 56 through the closed third clutch device 70 to the second shaft 58.

Since the first clutch device 10 is shifted in an opened shift position the torque of the first shaft 30 which loads the input part 22 of the first clutch device 10 is not transferred through the first clutch device 10 to the output part 24 and thus to the wheel 36 of the power shift transmission stage 36–80 so that the wheel 80 of the power shift transmission stage mounted on the second shaft 58 is substantially not loaded by the wheel 36 of the power shift transmission stage mounted on the first shaft 30.

If a shift is to be made into another gear stage, here assumed to be by way of example that a shift is to be made into the gear stage of third gear, then a signal is sent from a control device (not shown) to the first clutch device 10. This signal causes the first clutch device 10 to be closed at least in part. The concrete shift position of the first clutch device 10 which is initially controlled by the control device or drive device 14 or actuating device 16 depends in particular on predetermined characteristic values. Such characteristic values can be in particular the transmission ratio of the engaged gear stage of the output gear, thus here the gear stage of the first gear, or the transmission ratio of this gear stage or the identity of the shaft on which the third clutch device of the output gear is mounted or the speed or torque of the first 30 or the second shaft 58 or the like.

The controlled shift position of the first clutch device 10 or its release device 82 is in particular configured so that the third clutch device 70 can be shifted into a shift position in which no torque can be transferred between the toothed wheel 56 of the output gear or—here the first gear stage—and the third clutch 70. This shift is implemented so that all third clutch devices 66, 68, 70 are shifted in an opened shift position and torque is transferred between the first shaft 30 and the second shaft 58 only through the power shift transmission stage 36–80.

The first clutch device 10 or release device 82 of the first clutch device is then controlled so that it becomes possible that the transmission stage 42–52 of the target gear—here third gear—can be shifted by means of a third clutch device 68 without this third clutch device 68 and this toothed wheel 52 which is to be coupled to this third clutch device 68 having to be synchronised by means of synchronising rings or the like in order to ensure high operating reliability. To this end where necessary predetermined characteristics are used, such as for example the characteristics which are described above within the scope of the description regarding the closing of the first clutch device 10.

A shift is then made into the target gear. For the example where the target gear is third gear, the third clutch device 68 is shifted so that it connects the toothed wheel 52 mounted rotatable on the second shaft 58 rotationally secured to this second shaft 58.

The first clutch device 10 is then opened again so that the torque between the first shaft 30 and second shaft 58 is transferred completely through the target gear stage, here the transmission stage 42–52 of third gear.

Thus during the entire shift process between the starting gear and the target gear torque is transferred between the crankshaft 26 and a drive axle of a motor vehicle.

The first 10 and second clutch device 12 are mounted in particular at least in part in a common clutch housing 32.

Examples of embodiments of the actuating device 16 illustrated in FIG. 1 will now be explained.

Figure 2:
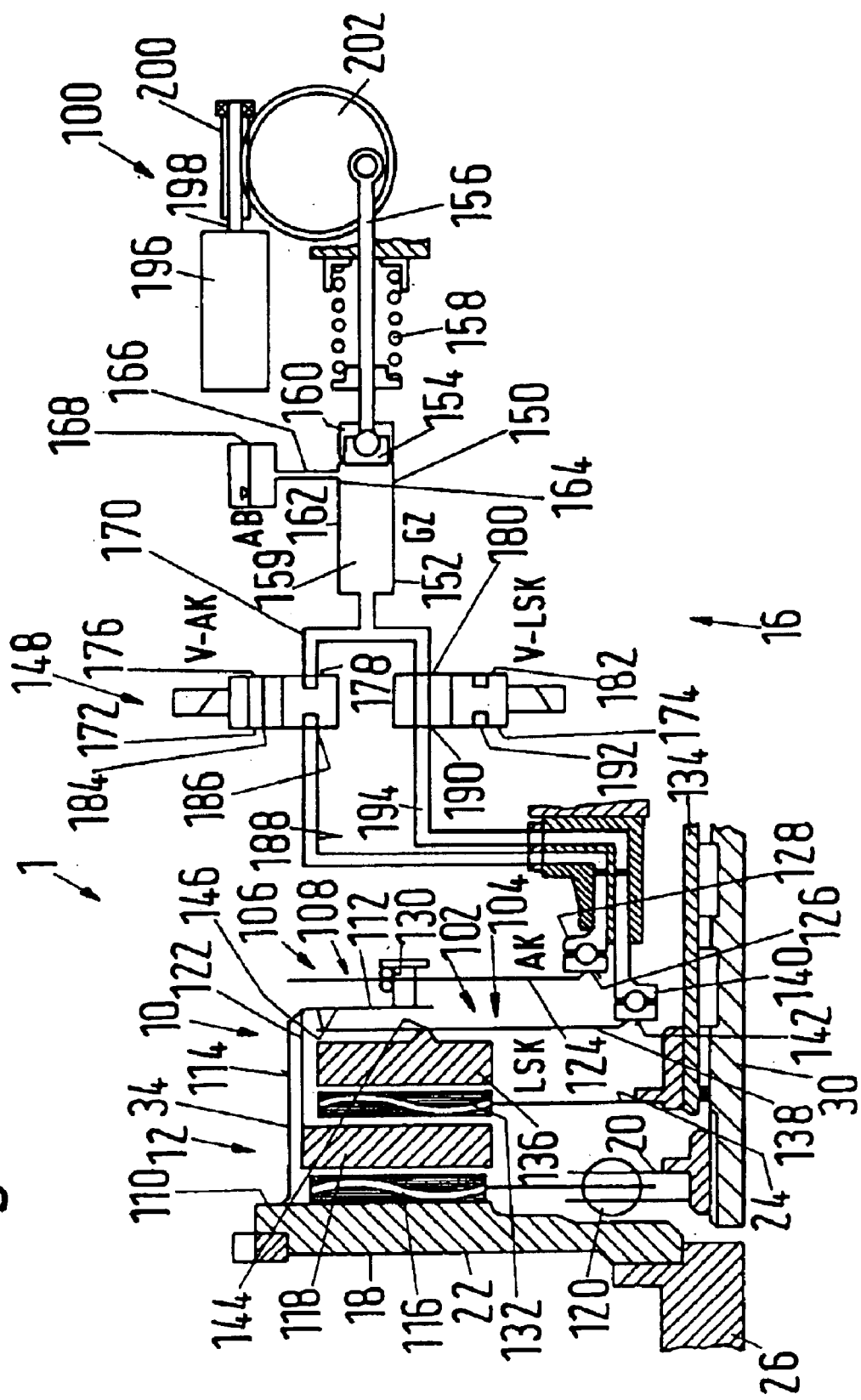
FIG. 2 shows a diagrammatic part sectional view of a second embodiment of the invention given by way of example.

FIG. 2 shows a diagrammatic view of an embodiment of a torque transfer device 1 according to the invention which has a first clutch device 10, a second clutch device 12, an actuating device 16 as well as a drive device 100. The first and second clutch devices 10, 12 each have a release device 102, 106 with release lever device 104, 108.

The crankshaft 26 of a motor vehicle is coupled rotationally secured to an input part 18, 22 of the first and second clutch device 10, 12. These input parts 18, 22 are coupled rotationally secured to a clutch cover 34. The clutch cover 34 has a first flange 110 running substantially in the radial direction, a second flange 112 extending likewise substantially in the radial direction and mounted radially inside the flange 110, as well as a substantially axially aligned cylindrical part 114 which connects the first flange 110 to the second flange 112. The first flange 110 is coupled rotationally secured to the input part 18 or 22 through suitable means such as screws or the like.

The second clutch device 12 has one or more clutch discs 116 as well as a contact pressure plate 118. The contact pressure plate 118 is mounted axially displaceable and can in at least one first shift position load the clutch disc 116 so that torque can be transferred between the contact pressure plate 118 and the clutch disc 116. In at least a second shift position the contact pressure plate 118 is mounted relative to the clutch disc 116 so that no torque can be transferred between these 116, 118. In at least a third shift position the contact pressure plate 118 contacts or loads the clutch disc so that a restricted torque can be transferred between same 116, 118.

The clutch disc 116 is coupled to the first shaft 30 through a spring and/or damper device 120 so that torque can be transferred between this clutch disc 116 and the first shaft 30. Predetermined torque shocks can be absorbed or compensated where appropriate by the spring and/or damper device 120.

The second clutch device 12 is formed as a self-sustaining start-up clutch and is closed substantially in a basically non-actuated shift position.

The release lever device 108 of the second clutch device 12 has an axial projection 122 which extends substantially parallel to the axis of the clutch disc 116 or the contact pressure plate 118 and engages in the contact pressure plate 118 of the second clutch device 12. The axial projection 122 extends from the contact pressure plate 118 substantially in the drive-side direction or in the direction which is remote from the crankshaft 26 and engages in a release lever 124 of the release lever device 108 of the second clutch device 12. The release lever 124 extends substantially radially and is in particular a plate spring device. Radially inside the coupling point between the release lever 124 and the axial projection 122 the release lever 124 can be loaded at one point 126 by a release bearing 128. This release bearing 128 is associated with the actuating device 16. Between the coupling point between the axial projection 122 and the release lever 124 on the one hand and the point 126 of the release lever 124 at which the release lever can be loaded by the release bearing on the other there is a bearing point 130 which is configured so that the release lever can be swivelled at least about this bearing point. This bearing point 130 or the bearing of the release lever 124 on this bearing point 130 is designed so that pressurised force exerted by the release bearing 128 at the point 126 on the release lever 124 causes tensile force which is exerted by the release lever 124 on the axial projection 122.

The first clutch device 10 has one or more clutch discs 132 which are coupled rotationally secured to a component part 134. The component part 134 extends substantially concentric with the first shaft 30. The clutch disc 132 or the component part 134 is an output part of the first clutch device 10. The clutch disc 132 of the first clutch device 10 can be loaded by a contact pressure plate 136 of this first clutch device 10. The contact pressure plate 118 of the second clutch device 12 is mounted between the clutch discs 116 of the second clutch device 12 and the clutch disc 132 of the first clutch device 10. The clutch disc 132 of the first clutch device 10 is mounted on the output side of the clutch disc 116 of the first clutch device 10, seen in the axial direction of the first shaft 30.

The contact pressure plate 136 of the first clutch device 10 can be loaded by a release lever 138 which is more particularly a plate spring. This release lever 138 can be loaded by a release bearing 140 associated with the actuating device 16. The point 142 on the release lever 138 at which the release bearing 140 loads this release lever 138 is mounted radially inside the point 144 at which this release lever 138 loads the contact pressure plate 136 of the first clutch device.

The release lever 138 is supported furthermore at a point 146 on the clutch cover 34 which is mounted radially outside of the point 144 of the release lever 138 at which the release lever loads the contact pressure plate 136 of the first clutch device 10.

A pressurised force with which the release bearing 140 loads the release lever 138 at the point 142 causes the release lever 138 to likewise load the contact pressure plate 136 with pressurised force at the point 144.

The first clutch device 10 is a depressed power shift clutch so that in the non-actuated state it is shifted in a substantially opened shift position.

The clutch disc 116, the contact pressure plate 118, the clutch disc 132, the contact pressure plate 136 as well as the release lever 138 are arranged inside a clutch housing or clutch cover 34.

The release lever 124 of the second clutch device 12 is mounted outside, more particularly axially outside of the clutch housing or clutch cover 34. The axial projection 122 extends through the clutch cover 34 in an axial direction so that a part of this axial projection is arranged more particularly axially outside of the clutch housing or clutch cover 34 and another part of this axial projection is arranged inside the clutch housing or clutch cover 34.

The actuating device 16 is at least in part formed as a hydraulic device 148.

The hydraulic device 148 has a master piston cylinder unit 150 with a master cylinder 152 as well as a master piston 154. The master piston 154 is connected to a piston ram 156 which can be loaded by the drive device. The master piston 154 is configured so that it can divide the master cylinder into a first chamber 159 as well as a second chamber 160. The cylindrical wall 162 of the master cylinder 152 has a snifting bore 164 which is connected to a volume compensating container 168 through a hydraulic line 166. The master piston 154 is mounted axially displaceable and—seen in the axial direction of the master cylinder 152—can be mounted on both sides of the snifting bore 164. The master piston 154 can travel axially over the snifting bore 164 and where applicable close it in an intermediate position.

The master cylinder is connected through a hydraulic pipeline assembly 170 to a second 2/2-way valve 172 as well as to a first 2/2-way valve. The 2/2-way valve 172 as well as the 2/2-way valve 174 each have two master connections 176, 178 and 180, 182. These master connections 176, 178, 180, 182 are connections of the 2/2-way valve 172 or 174 which can each be connected in a relevant shift position of these 2/2-way valves 172, 174 through a pipeline assembly 170 to the master cylinder 152.

The 2/2-way valve 172 furthermore has two second slave connections 184, 186 which can be connected to a pipeline assembly 188 whereby this pipeline assembly 188 can produce a connection to a second slave cylinder or directly or indirectly to the release bearing 128.

In a corresponding way the 2/2-way valve 174 has two second slave connections 190, 192 which can be connected through a first pipeline assembly 194 to a first slave cylinder or to a pipeline assembly 194 which if the hydraulic fluid contained in this pipeline assembly 194 has a predetermined pressure can load the first release bearing 140.

The drive device 100 has an E-motor 196 which can load an output shaft 198 of this E-motor. The output shaft of this E-motor 198 has a spline 200 which is in particular a worm gearing. This spline 200 drives a wheel 202, more particularly a worm wheel. The ram 156 which is connected to the master piston 154 is mounted eccentric and rotationally movable on this wheel 202. If necessary, although not shown here, a gear rod linkage is connected in between the ram 156 and the wheel 202.

The ram 156 or the master piston 154 is furthermore loaded by a spring device 158.

The spring device 158 is mounted outside of the master cylinder 152.

The second 2/2-way valve 172 is designed so that in one shift position, shown in FIG. 2, it breaks the connection between a master connection 178 and a second slave connection 186 and in a second shift position, not shown here, it produces a connection between the master connection 176 and the second slave connection 184.

The first 2/2-way valve 174 is designed so that in one shift position it produces a connection between the master connection 180 and a first slave connection 192, and in another shift position, not shown in FIG. 2, it interrupts the connection between the master connection 182 and the first slave connection 192. The 2/2-way valves 172, 174 are actuated electromagnetically.

The torque transfer device 1 according to the invention enables the electric motor 196 to be assisted by the spring device 158 both during actuation of the first clutch device 10 and also during actuation of the second clutch device 12.

If the first clutch device 10 which is substantially opened in the basic position is to be increasingly closed, then the first 2/2-way valve device 172, 174 is shifted into a shift position in which the master connection 180 is connected to the first slave connection 190.

The electric motor 196 causes the master piston 154 to load the hydraulic fluid in the master cylinder 152 and in the hydraulic pipeline 170 if or as soon as the master piston 154 is disposed on the side of the snifting bore 164 facing the master connection 180. Since the master connection 180 and the first slave connection 190 is connected through the 2/2-way valves 174 the release bearing 10 is loaded so that the contact pressure plate 136 is moved in the direction of the clutch discs 132 of the first clutch device.

The second clutch device 12 is shifted in a basic position in a closed shift position. If the second clutch device 12 is to be opened more and more then the second valve device 172 is shifted so that the master connection 176 is connected to the second slave connection 184. If the electric motor 196 now loads the master piston 154 and the master piston 154 is mounted inside the master cylinder on the side of the snifting bore 164 facing the master connection 176 then the release bearing 128 is loaded so that the contact pressure plate 118 is moved into a movement direction which is away from the clutch disc 116 of the second clutch device 12.

With both types of operation described above the spring device 158 each time acts on the master piston 154 so that the spring force of the spring device 158 which is in particular a pressurised spring device acts together with the drive force of the electric motor on the piston device.

If the master piston 154 is moved back and is disposed inside the master cylinder on the side remote from the master connection 176, 178, 180, 182 then the hydraulic system can be relaxed at least in part.

If the second 2/2-way valve 172 connects the master connection 176 to the slave connection 184 then the hydraulic pipeline arrangement 188 between this second slave connection 184 and the second slave cylinder or the release bearing 128 as well as the hydraulic pipeline arrangement 170 between the 2/2-way valves 172, 174 and the master cylinder 152 as well as the first chamber 159 of the master cylinder are relaxed. Volume or pressure compensation with the compensating container 168 hereby takes place.

If the first valve device 174 is designed so that the master connection 180 is connected to the first slave connection 190, the hydraulic pipeline arrangement 194 between the 2/2-way valve 174 and the first slave cylinder or the release bearing 140 as well as the pipeline arrangement 170 between the 2/2-way valve 172, 174 and the master cylinder 152 as well as the first chamber 159 of the master cylinder are relaxed so that volume or pressure compensation with the compensating container 168 is produced.

A combination of the two shifts is possible according to the invention so that the entire system can be substantially hydraulically relaxed.

Figure 3:
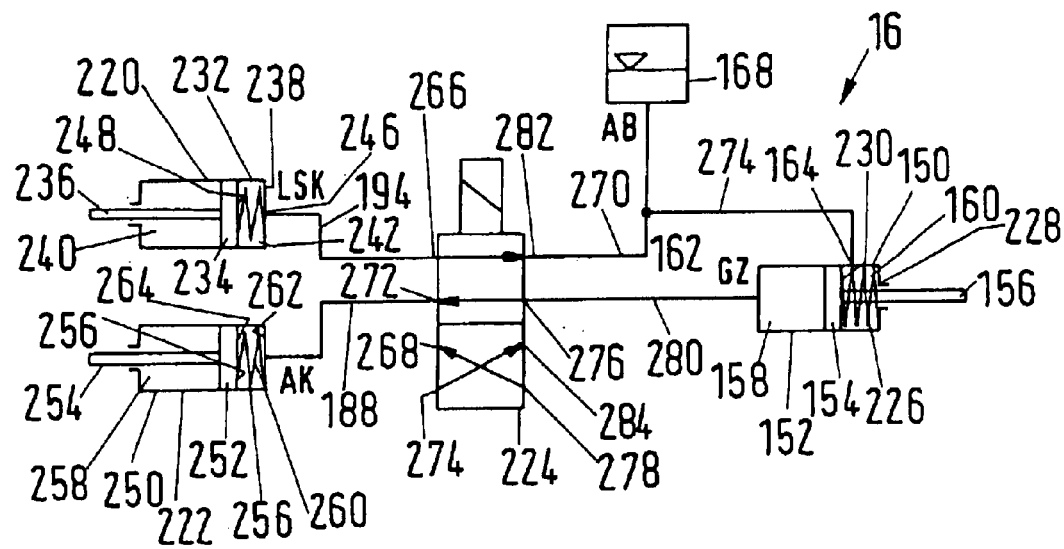
FIG. 3 shows a diagrammatic part sectional view of a third embodiment of the invention given by way of example.

FIG. 3 shows in a diagrammatic partial view an example of an actuating device according to the invention for a torque transfer device according to the invention.

The actuating device 16 has a master piston cylinder unit 150 with a master cylinder 152 and a master piston 154 mounted axially displaceable in this master cylinder 152 as well as a first slave piston cylinder unit 220, a second slave piston cylinder device 222, a compensating container 168 and a valve device which is here a 4/2-way valve device 224. Inside the master cylinder 152 is a spiral spring 226 which is supported on one side on an inside end face 228 of the master cylinder 152 and on the other side on an end face 230 of the master piston 154 facing this end side face 228, namely so that the master piston 154 is loaded with pressure. The cylindrical wall 162 of the master cylinder 152 has a snifting bore 164 which is arranged so that the master piston 154 can travel over this snifting bore 164 so that seen in the axial direction of the master cylinder 152 it can be mounted on the different sides of this snifting bore 164.

The first slave piston cylinder unit 220 has a first slave cylinder 232 as well as a first slave piston 234 mounted axially displaceable inside this first slave cylinder 232. The first slave piston 234 is coupled to a first slave piston ram 236 which projects out from the first slave cylinder 232. This first slave piston ram 236, although not shown in FIG. 3, is coupled to a release bearing so that it can load this release bearing. The first slave piston ram 236 can act so that a first clutch device 10 or the power shift clutch can be actuated or loaded.

The first slave piston 234 divides the first slave cylinder 232 into two chambers 238, 240. Inside the first chamber 238 which is mounted on the side of the first slave piston 234 remote from the first slave piston ram 236 there is a spiral spring 242 namely arranged so that it is supported by one end on an end side face 246 of the first slave cylinder 232 and by another end on an end face 248 of the first slave piston 234. The spiral spring 242 is mounted inside the first chamber 238 of the first slave cylinder 232 so that it loads the first slave piston 234 with pressurised force. This pressurised force is however preferably less than the pressurised force which is produced by the spiral spring 226 which is mounted in the first chamber 159 of the master cylinder 152.

The second slave piston cylinder unit has a second slave cylinder 250, and a second slave piston 252 mounted axially displaceable in this second slave cylinder 250 and connected to a second slave piston ram 254. The second slave piston 252 divides the second slave cylinder 150 into a first chamber 256 and a second chamber 258.

The second slave piston ram 254 projects through an opening out from the second slave cylinder 250. On the side of the second slave piston 252 remote from this slave piston ram 254 a spiral spring 260 is mounted in the first chamber 256 of the second slave cylinder 250 and is supported by one end against an inner end face 262 of the second slave cylinder 250 and by its other end on an end face 264 of the second slave piston 252, and loads the slave piston 252 with pressure.

The pressurised force exerted by this spiral spring 260 on the second slave piston 252 is substantially less than the pressurised force which the spiral spring 226 exerts on the master piston 154.

The 4/2-way valve device 224 has two first slave connections 266, 268 which can be connected through a pipeline arrangement 194 to the first chamber 238 of the first slave cylinder 232, two second slave connections 272, 274 which can be connected through a pipeline arrangement 188 to the first chamber 256 of the second slave cylinder 250, two master connections 276, 278 which can be connected through a pipeline arrangement 280 to the first chamber 159 of the master cylinder 152, as well as two volume compensating connections 282, 284 which can be connected through a pipeline arrangement 286 to the volume compensating container 168.

The 4/2-way valve device 224 can be actuated electromagnetically.

The snifting bore 164 of the master cylinder 152 is connected through a pipeline arrangement 288 to the volume compensating container 168. This pipeline arrangement 288 opens into the pipeline arrangement 286.

The 4/2-way valve device 224 can be shifted into a shift position, as shown in FIG. 3, in which the 4/2-way valve device 224 connects the master connection 276 to the second slave connection 272, as well as the first slave connection 266 to the volume compensating connection 282. In this shift position the first chamber 159 of the master cylinder 154 is connected to the first chamber 256 of the second slave cylinder 250 and the first chamber 238 of the first slave cylinder 232 to the volume compensating container 168.

In a first shift position of the 4/2-way valve 224 the master connection 276 is connected to the first slave connection 272 and the first slave connection 266 to the volume compensating connection 282.

In this shift position load of the drive device (not shown) acting on the master piston 154 has the effect that the second slave piston 252 can be loaded—through the hydraulic fluid—, and thus the start-up clutch or the second clutch device can be actuated. The spiral spring 226 causes force to be applied to the master piston 154 which with low forces of the drive device is opposite to these drive forces and with higher forces is in the same direction.

At the same time volume compensation is possible between the first chamber 238 of the first slave cylinder and the volume compensating container 168.

If in this shift position the master piston 154 is loaded with force by the drive device (not shown in FIG. 3) which causes the second slave piston 256 to be loaded then at the same time the spiral spring 226 mounted in the second chamber 160 of the master cylinder 152 acts on the piston 154 and namely in the same direction as the force produced by the drive device.

In one valve position of the 4/2-way valve 224 the master connection 276 is connected to the first slave connection 268 and the second slave connection 274 is connected to the volume compensating connection 284. If in this shift position the master piston 154 is loaded by the drive device (not shown) and the master piston 154 is mounted on the side of the snifting borer 164 facing the 4/2-way valve 224 then the first slave piston 234 is loaded so that through the first slave piston ram 236 an actuating force is exerted on the first clutch device or its release lever device. The force acting on the slave piston 234 is comprised in particular of a force part which is generated by the drive device as a result of loading of the master piston 154, as well as a force part which is generated by the load of the spring device 226.

The force of the spring device 226 and the force of the drive device are superimposed on each other and generate an actuating force on the release lever device of the first clutch device. Where necessary the spring force of the spiral spring 242, which is mounted in the first chamber 238 of the first slave cylinder 232 acts on the first slave piston.

Before a change can be made from one of the two valve positions into the other, the master piston is drawn back so that it is disposed on the side of the snifting bore 164 remote from the 4/2-way valve device 224. In both shift positions of the 4/2-way valve device 224 the shift position of the master piston 154 enables a volume or pressure compensation between the first chambers 238, 256 and the volume compensating container 168 whereby one of the two first chambers 238, 256 is connected directly to the volume compensating container 168 through the 4/2-way valve device 224, and the other of the two first chambers 238, 256 is connected through the 4/2-way valve device 224 as well as the first chamber 158 of the master cylinder 152 as well as the snifting bore 164 and the pipeline arrangement 274, to the volume compensating container 168.

The device according to the invention thus makes it possible, particularly through the combination of the spiral spring 226 and the 4/2-way valve device 224 with the volume compensating container 168, that the spiral spring 226 assists the drive device during actuation of the first and second clutch devices.

The spiral springs 242, 260 which are arranged in the first chamber 238 of the first slave cylinder 232 and first chamber 240 of the second slave cylinder 250 respectively have the effect, particularly when the force level is relatively low, that the release lever devices of the first clutch device and second clutch device bear against the clutch when these release lever devices are not actuated by the drive device.

After the master piston 154 in a retracted position has allowed the system to relax or a volume or pressure compensation to be undertaken with the volume compensating container the 4/2-way valve device 224 is shifted into a different position. The master piston 154 is now loaded by the drive device, assisted by the spiral spring 226 so that according to the shift position of the 4/2-way valve device 224 the clutch device which is now shifted is actuated as soon as the master piston 154 has travelled over the snifting bore 164 and faces the 4/2-way valve device 224.

Figure 4:
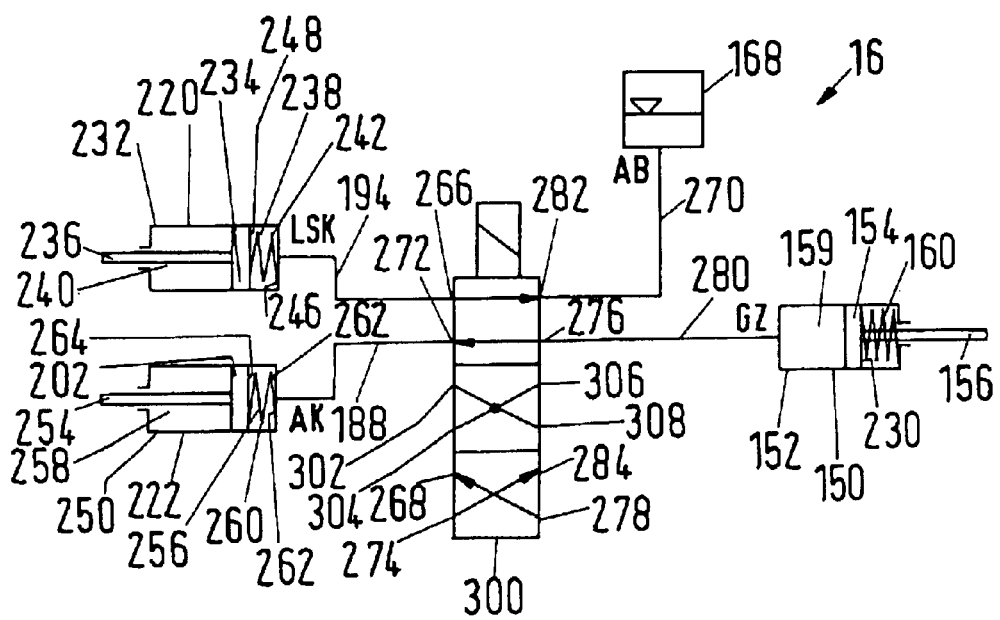
FIG. 4 shows a diagrammatic part sectional view of a fourth embodiment of the invention given by way of example.

The embodiment of the invention illustrated in FIG. 4 differs from the embodiment illustrated in FIG. 3 in particular in that the valve device is designed differently and in that the master cylinder 152 has no snifting bore 164 or is not connected to the volume compensating container 168 through a snifting bore 164 and a pipeline arrangement 274. As opposed to FIG. 3 the valve device is here not a 4/2-way valve device 224, but a 4/3-way valve device 300.

The 4/3-way valve device 300 has the connections 266, 268, 270, 272, 274, 276, 278 which were already explained with reference to FIG. 3. Furthermore the 4/3-way valve device 300 can be shifted into the two valve positions which were already explained with reference to the 4/2-way valve device 224 in FIG. 3.

In addition the 4/3-way valve device 300 has a further valve position as well as a further first slave connection 302, a second slave connection 304, a further volume compensating connection 306 and a further master connection 308.

This further valve position can be configured so that the first slave connection 302 is coupled to the master connection 308 and the second slave connection 304 is coupled to the volume compensating connection 306 or so that the first 302 and the second slave connection 304, the volume compensating connection 306 and the master connection 308 are all coupled together.

In the first variation of the embodiment, in both shift positions as already explained in FIG. 3, one slave piston 234, 252 can be loaded by the master piston 154 whilst the first chamber 238, 256 adjoining the other of these slave pistons 234, 252 is connected to the volume compensating container so that a pressure or volume compensation is possible between these chambers 238 and 256 respectively and the volume compensating chamber. If now a volume or pressure compensation is to be possible in the other of the first chambers 238, 256 then the master cylinder is first moved back, thus into a position of the snifting bore 164 in a direction away from the 4/3-way valve device 300. The 4/3-way valve device is then shifted into the intermediate position so that each other of the first chambers 238, 256 is connected to the volume compensating container 168. The 4/3-way valve device can then be shifted into the original or third valve position.

According to the second embodiment where the connections 302, 304, 306, 308 are all connected to each other in a predetermined valve position, the master piston 154 is likewise moved into a fully retracted position before it is switched over into this valve position. In this valve position pressure compensation becomes possible for the entire hydraulic system, thus in particular the first chamber 238 of the first slave cylinder 232, the first chamber 256 of the second slave cylinder 250, the connecting pipeline system 188, 194, 270, 280 as well as the second chamber 258 of the master cylinder 250.

The first 10 and second clutch device 12 are moved into their starting positions since these are substantially pressure-free or loaded with atmospheric pressure respectively. The original valve position can then be shifted back or can be shifted into a third valve position.

The three valve positions are preferably arranged so that the valve position in which the connections 302 and 308 as well as 304, 306 or 302, 304, 306 and 308 are connected is preferably an intermediate position so that during movement of the valve into the one direction a further valve position is shifted and during movement of the system into the other direction a further valve position is likewise shifted.

It should be pointed out that in all embodiments according to the invention the volume compensation can be undertaken on the one hand in order to produce a relaxation in the predetermined pipeline arrangements or chambers, such as in particular the first chamber 238 of the first slave cylinder 232 or the first chamber 256 of the second slave cylinder 250, or to set the actuating system, thus in particular the hydraulic stretch between the master piston 154 and the slave piston 234, 252 actuated by same, to a predetermined hydraulic oil volume, and where necessary to eliminate gases such as air or the like from this stretch.

More particularly in a second variation it is ensured that the master piston 154 is shifted into a predetermined shift position with each volume compensation.

Figure 5:
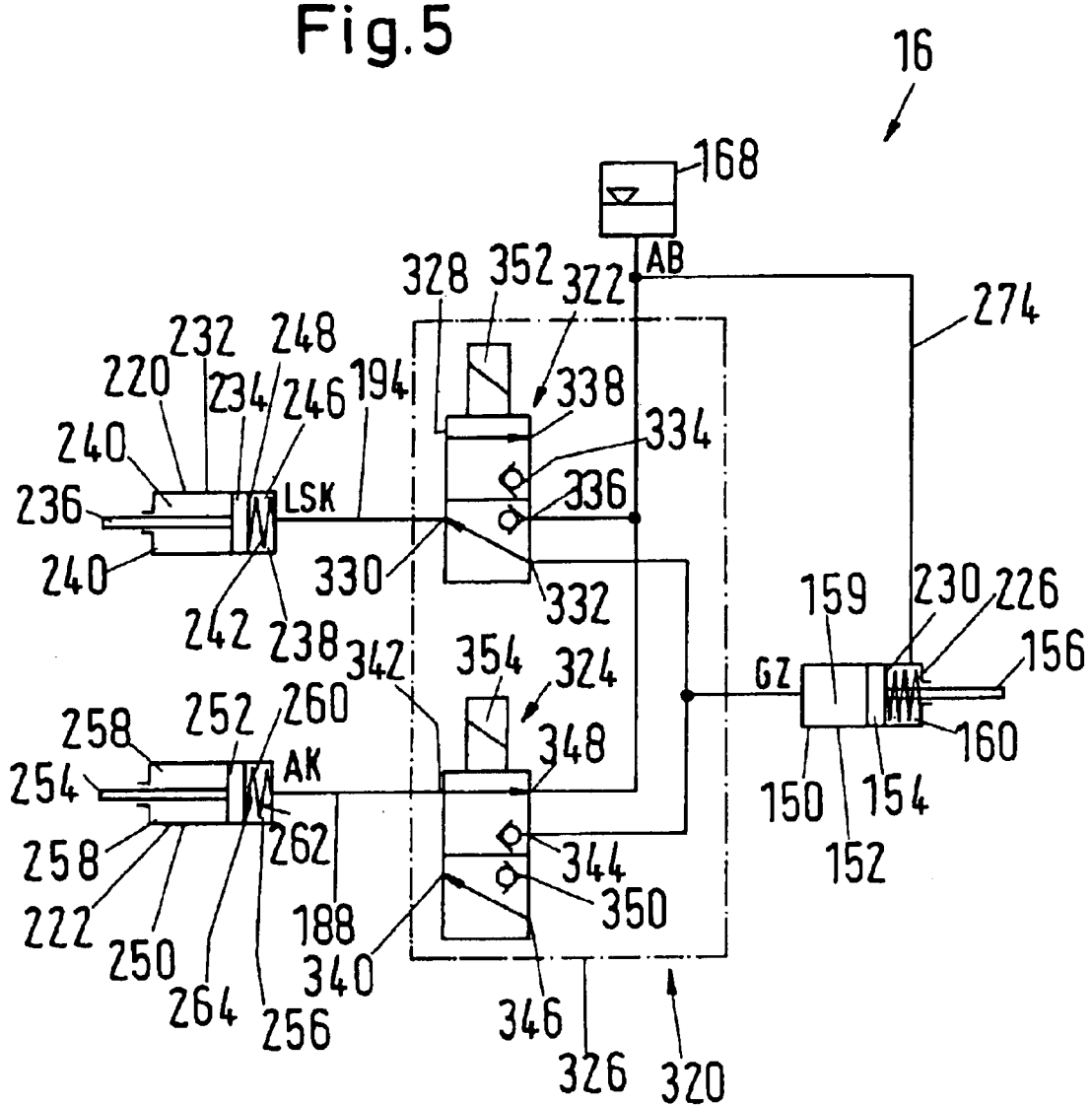
FIG. 5 shows a diagrammatic part sectional view of a fifth embodiment of the invention given by way of example.

The embodiment of the invention illustrated in FIG. 5 differs from the embodiment of the invention illustrated in FIG. 3 basically through the configuration of the valve device 320.

The valve device 320 has a first valve 322 as well as a second valve 324 which are mounted in a common housing 326. The first valve 322 is a 3/2-way seat valve which can be actuated electromagnetically and which has two first slave connections 328, 220, two master connections 332, 334 and two volume compensating connections 336, 338. The second valve 324 is likewise an electromagnetically actuated 3/2-way seat valve and has two second slave connections 340, 342, two master connections 344, 346 as well as two volume compensating connections 348, 350.

In one valve position of the first 3/2-way seat valve the master connection 332 is connected to the first slave connection 330 whilst the volume compensating connection 336 is shut off. In one valve position of this first 3/2-way seat valve the master connection 334 and the first slave connection 328 are connected to the volume compensating connection 338.

In this shift position the first chamber 238 of the first slave cylinder can be released since it is connected to the volume compensating container.

The second valve 324 of the valve device 320 can be shifted into a shift position in which the second slave connection 342 is connected to the volume compensating connection 348 wherein the master connection 344 is shut off and into a further shift position in which the master connection 346 is connected to the second slave connection 340 wherein the compensating container connection 350 is shut off.

The valves 322 and 324 can each be controlled by a separate magnet 352, 354.

Figure 6:
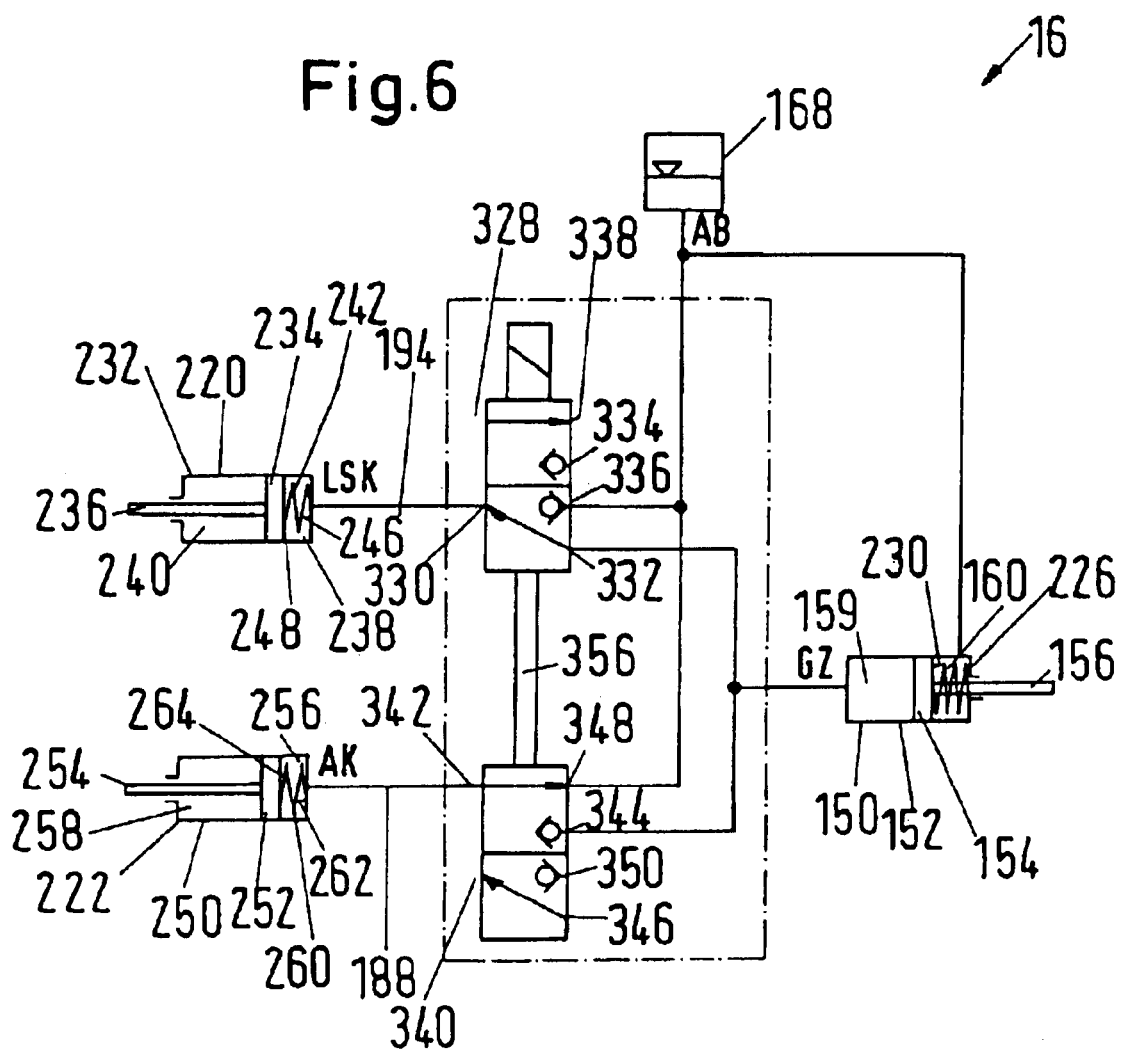
FIG. 6 shows a diagrammatic part sectional view of a sixth embodiment of the invention given by way of example.

The embodiment according to FIG. 6 differs from the embodiment according to FIG. 5 in that one common magnet 356 is provided in place of two separate magnets for actuating the first valve 322 and second valve 324 respectively.

Figure 7:
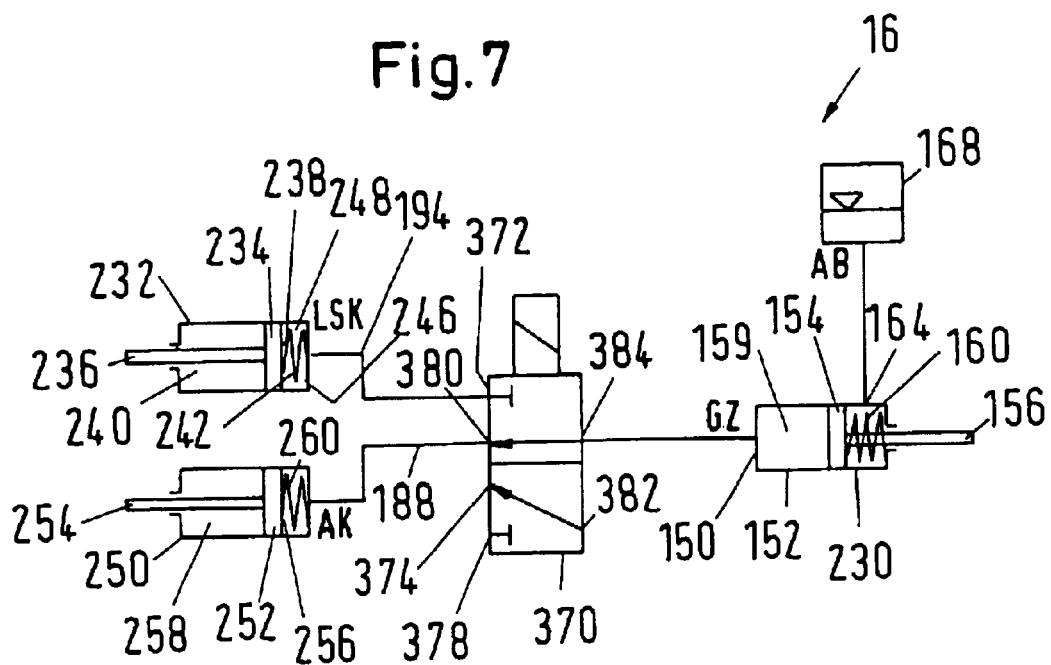
FIG. 7 shows a diagrammatic part sectional view of a seventh embodiment of the invention given by way of example.

The embodiment of an actuating device according to the invention and illustrated by way of example in FIG. 7 differs from the embodiment illustrated in FIG. 3 substantially in the configuration of the valve device and in that the valve device according to FIG. 7 unlike the valve device according to FIG. 3 has no connection which is linked directly to the volume compensating container 168.

In the embodiment according to FIG. 7 the valve device is a 3/2-way valve 370 which has two first slave connections 372, 374, two second slave connections 378, 380 as well as two master connections 380, 382. The 3/2-way valve device can be actuated electromagnetically.

In one valve position the master connection 382 is connected to the first slave connection 374 whilst the second slave connection 378 is shut off. In the other valve position the master connection 384 is connected to the second slave connection 380 whilst the first slave connection 372 is shut off.

As opposed to the embodiment according to FIG. 3, in the embodiment according to FIG. 7 the first chamber 238 or 256 which adjoins the slave piston 234 or 252 which is not loaded by the master piston 154 is not connected to the volume compensating container 168. Instead, the relevant slave connection 372 or 378 is shut off so that hydraulic fluid is contained between this slave connection 372 and the first chamber 238 of the first slave cylinder 232 or between the connection 378 and the first chamber 256 of the second slave cylinder 250. Each other first chamber 238 or 256 is loaded by means of the drive device (not shown) and the spring device 226. A volume or pressure compensation can be carried out in the embodiment according to FIG. 7 in respect of the first chamber 238 or 256 in that the master cylinder 154 is moved into a retracted position in which it is disposed on the side of the snifting bore 164 remote from the 3/2-way valve device whereby the master connection 384 is connected to the second slave connection 380 and the master connection 382 is connected to the first slave connection 374, respectively.

Figure 8:
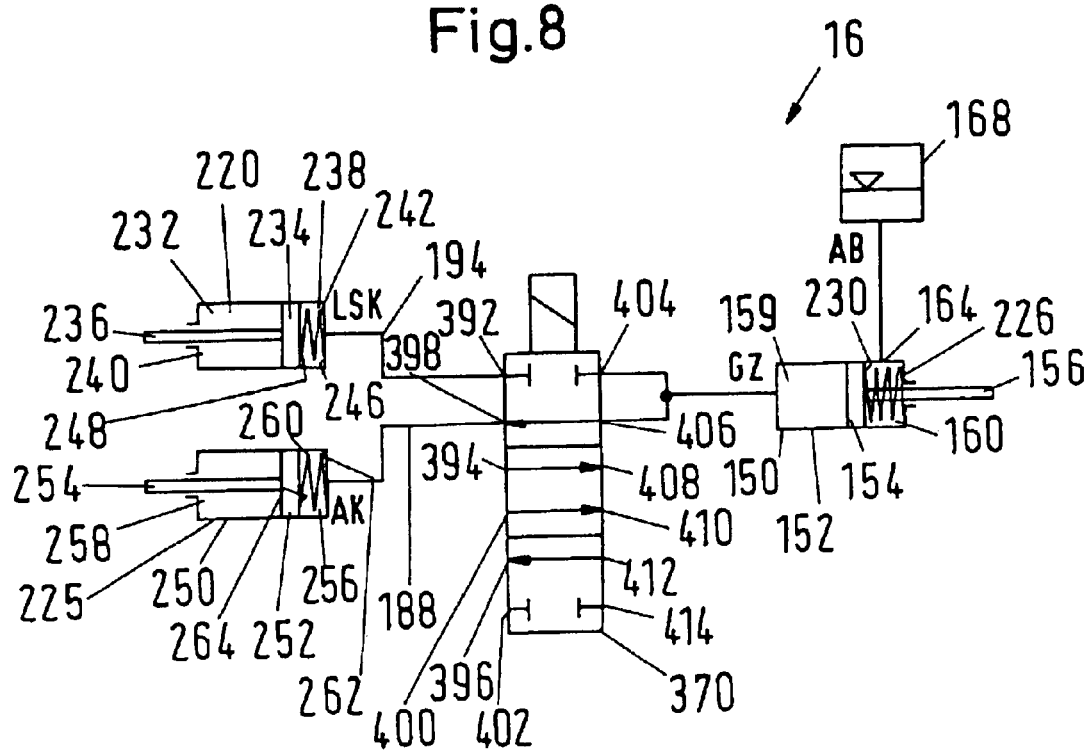
FIG. 8 shows a diagrammatic part sectional view of a eighth embodiment of the invention given by way of example.

The embodiment of the invention illustrated in FIG. 8 differs from the embodiment of the invention illustrated in FIG. 7 substantially through the configuration of the valve device.

In the embodiment according to FIG. 8 a 4/3-way valve device 390 is provided which has three first slave connections 392, 394, 396, three second slave connections 398, 400, 402 as well as six master connections 404, 406, 408, 412, 414.

In a first valve position of this 4/3-way valve device the first slave connection 392 and the master connection 404 are shut off whilst the master connection 406 is connected to the second slave connection 398. Preferably adjoining this valve position there is the valve position where the first slave connection 394 is connected to the master connection 408 and the second slave connection 400 is connected to the master connection 410.

Preferably adjoining this valve position there is a valve position where the first slave connection 396 is connected to the master connection 412 and the second salve connection 402 is connected to the master connection 414.

In the first valve position where the connections 406 and 398 are connected, the drive device, assisted by the spiral spring 226 causes the second slave ram 254 to be loaded.

In this valve position it can furthermore be possible for the first chamber 256 of the second slave cylinder 250 to be released or connected to the volume compensating container 168 by the slave piston 154 moving into a retracted position in which is disposed on the side of the snifting bore 164 remote from the 4/3-way valve device. In this shift position the first chamber 256 of the second slave cylinder 250 is connected to the volume compensating container 168 through the master cylinder 152.

In the second shift position in which the connection 394 is connected to the connection 408 and the connection 400 is connected to the connection 410 it is possible in particular that the entire system is shifted pressure-less or is connected to the volume compensating container 168. The master cylinder can in this shift position of the 4/3-way valve device 390 be moved into a retracted position in which it is disposed on the side of the snifting bore 164 remote from the 4/3-way valve device 390. In this shift position of the 4/3-way valve device 390 and master piston 154 the first chamber 238 of the first slave cylinder 232 and the first chamber 256 of the second slave cylinder 250 are each connected to the volume compensating container 168 through the 4/3-way valve device 390 and the first chamber 159 of the master cylinder 152. In the third shift position of the 4/3-way valve device the drive device, assisted by the spiral spring 226 can cause the first master piston 154 to become loaded and in particular can actuate the first clutch device whilst a volume is enclosed between the second slave connection 402 and the second slave piston 252 of the slave cylinder 250. In this shift position as the master piston 154 moves back to the side of the snifting bore 164 remote from the 4/3-way valve device it becomes possible for the first chamber 238 of the first slave cylinder 232 to be connected to the volume compensating container 168 through the first chamber 159 of the master cylinder 152.

Figure 9:
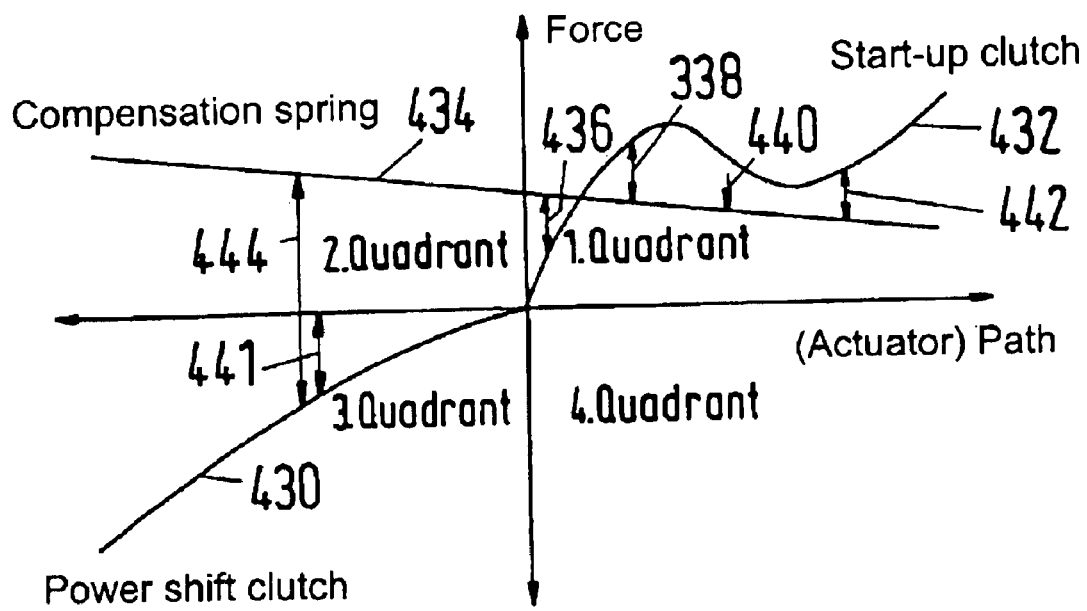
FIG. 9 shows a first force-path curve.
Figure 10:
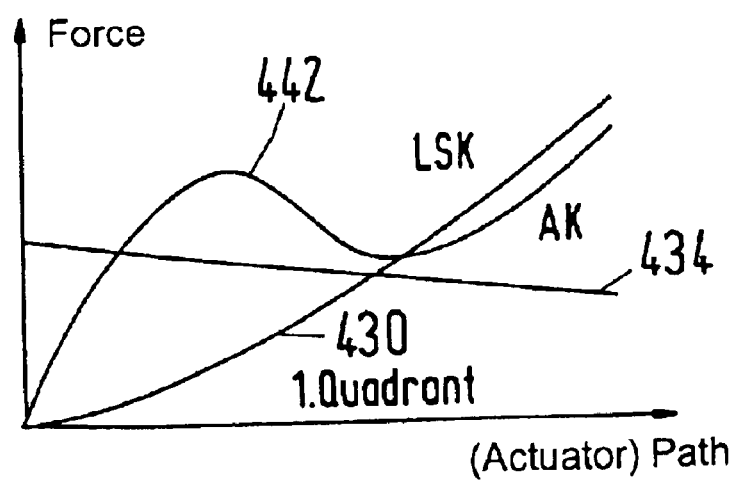
FIG. 10 shows a second force-path curve.

FIGS. 9 and 10 clearly show the action of a valve device according to the invention which is mounted inside the actuating device 16, on the force-path curve at a predetermined point of the system, such as for example at a predetermined point of the actuating device or at a predetermined point of the drive device or at a predetermined point of the release lever device.

FIG. 9 shows the force-path curve 430 which is provided during actuation of the first clutch device on this or its release lever device, as well as the force-path curve 432 which during actuation of the second clutch device 12 is provided on this or its release lever device. FIG. 9 furthermore shows the force-path curve 434 which is caused during actuation by a compensation spring or spring device 226 on the relevant clutch device 10, 12.

As can be seen from the force-path curves 430, 432, 434 shown in FIG. 9, a torque transfer device which shows the force-path curves 430, 432, 434 of FIG. 9 is configured so that a tensile force has to be produced on the release lever device of the first clutch device 10 for actuation whilst a pressurised force has to be produced on the release lever device on the second clutch device 432. If a spring or compensation spring acts on a master piston in order to assist the drive device, the drive device is substantially relaxed. In order to create the corresponding path indicated on the horizontal axis the force indicated by way of example by the double arrows 436, 438, 440, 442 has to be produced each time by the drive device. These double arrows 436, 438, 440, 442 show the force by way of example for individual operating points. Regarding the curve overall the drive device must apply for each operating point the force which is produced for a relevant (actuator) path as the difference of the force-path curve 432 of the second clutch device 12 and the force-path curve 434 of the spring device. If the force indicated in one operating point by the force-path curve 432 is greater than the force indicated by the force-path curve 434, then the drive device must generate a pressurised force onto the release lever actuating device. Otherwise the drive device must produce a tensile force on the relevant release lever device.

FIG. 9 shows that the forces to be produced by the drive device are reduced through the spring device 226, and more particularly the maximum drive force required is reduced. Without a spring device the force would have to be produced by the drive device which is indicated in the relevant operating point through the force-path curve 432, namely in relation to the horizontal co-ordinate axis.

The same applies correspondingly for the actuation of the first clutch device.

Since the spring 226 is a compression spring and the first clutch device 10 has to be loaded with tensile force, during actuation of the first clutch device the required drive force is however increased, as shown by comparing the double arrows 444, 446.

Through the device according to the invention it now happens that the release lever devices of the first 10 and second clutch device 12 are loaded with pressure by an actuating device. Regarding the force-path curve 430 of FIG. 9 this now moves round from the third quadrant into the first quadrant, as shown in FIG. 10. The spring device 226 thus assists both actuation of the first clutch device 10 and actuation of the second clutch device 12.

Figure 11:
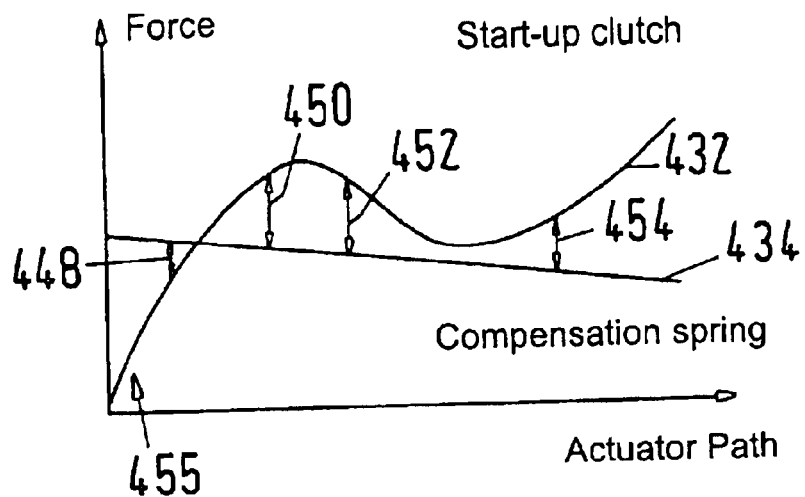
FIG. 11 shows a third force-path curve.

FIG. 11 differs from FIG. 10 in that the force-path curve 430 of the first clutch device 10 has not been entered.

FIG. 11 shows through the double arrows 448, 450, 452, 454 by way of example that the force to be produced by the drive device for actuating the release lever device of the second clutch device is substantially reduced.

Only in the event of low loads, which appear in the region indicated by the arrow 455 is the force which is to be generated by the drive device slightly increased.

This influence can however be prevented by suitable designs.

Figure 12:
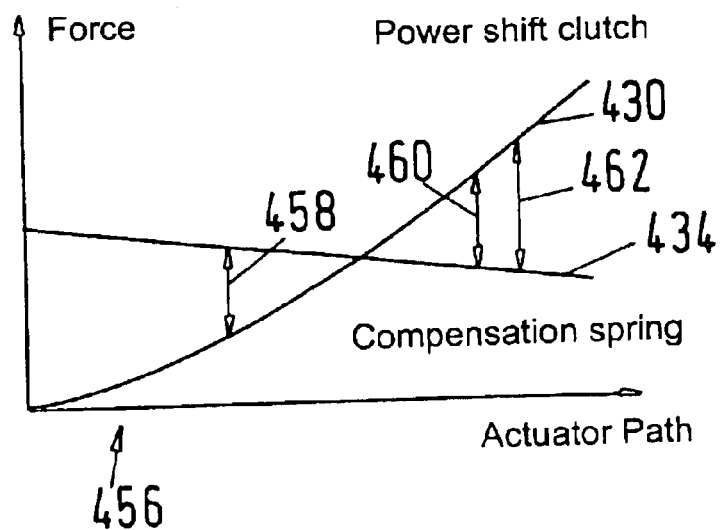
FIG. 12 shows a fourth force-path curve.

FIG. 12 shows the force-path curves 430, 434 which are provided during actuation of the first clutch device.

In the region 456 where slight loads are required to actuate the first clutch device the load which is to be generated by the drive device is slightly increased.

With higher loads the force to be generated by the drive device for actuating the first clutch device is clearly reduced, as shown by the double arrows 458, 460, 462.

Figure 13:
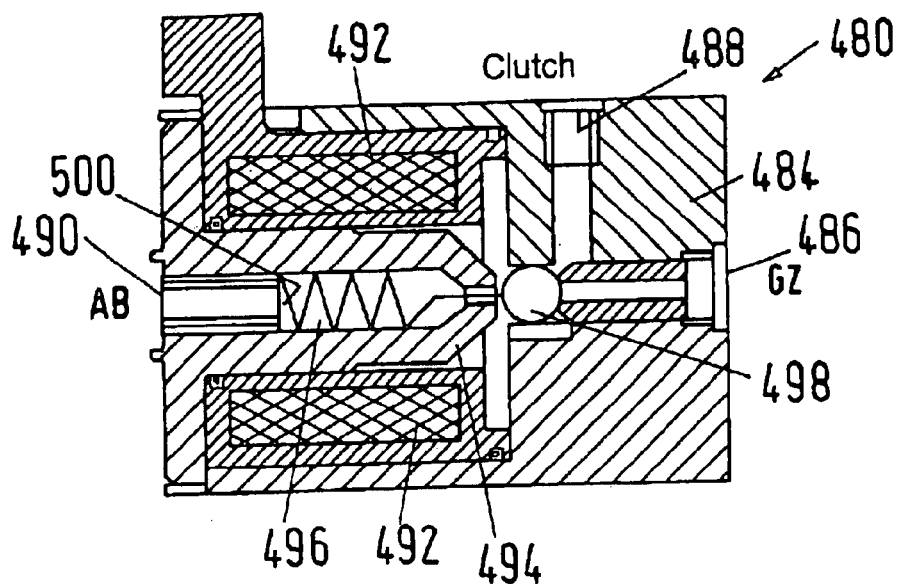
FIG. 13 shows a diagrammatic part sectional view of a ninth embodiment of the invention given by way of example.
Figure 14:
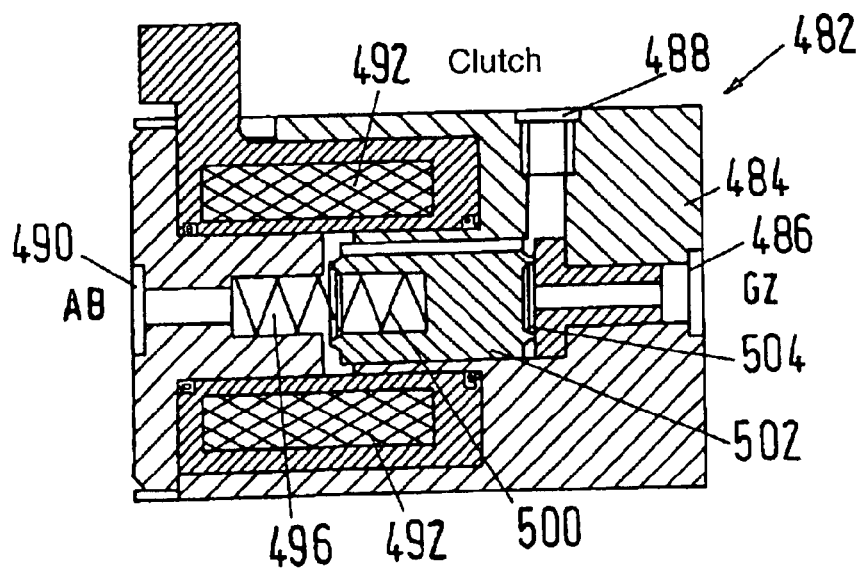
FIG. 14 shows a diagrammatic part sectional view of a tenth embodiment of the invention given by way of example.

FIGS. 13 and 14 each show a 3/2-way seat valve 480, 482 respectively. These 3/2-way seat valves 480, 482 can be used in the actuating device 416 of the torque transfer device according to the invention, namely for example each as the valves 322 and 324 of FIG. 5.

More particularly two of the valves 480 and 482 can be used to actuate the first and second clutch device.

The 3/2-way seat valve 480 has a valve housing 484 with a master connection 486, a slave connection 488 as well as a volume compensating connection 490. Furthermore the 3/2-way seat valve 480 has a coil 492 which can have current passing through. The effect of supplying current to the coil is that a component part 494 which is preferably cylindrical and has a through bore 496 is magnetised.

This magnetic field can act to attract the ball 498 to the component part 494.

The ball 498 is arranged so that it is loaded by a spring device 500, namely so that it shuts off the master cylinder connection 486. If the master connection 486 is shut off then the compensating connection 490 and the slave cylinder connection 488 are connected.

If the magnetic field produced by the coil 492 causes the ball 498 to be drawn against the component part 494 then the compensating connection 490 becomes closed whereby the master connection 486 is connected to the slave connection 488.

The spring device 500 is in particular arranged so that it is supported on one side against the component part 494 and on the other side against the ball 498.

The embodiment according to FIG. 14 differs from that according to FIG. 13 in particular in that in place of a ball 498 a component part 502 is provided which has a flat end side 504 which can close the master connection 486. Not shown but likewise preferred however is using a conical element in place of the ball 498 or component part 502 with flat end face 504, so that the conical element can close the master connection 486 by its cone tip.

Figure 15:
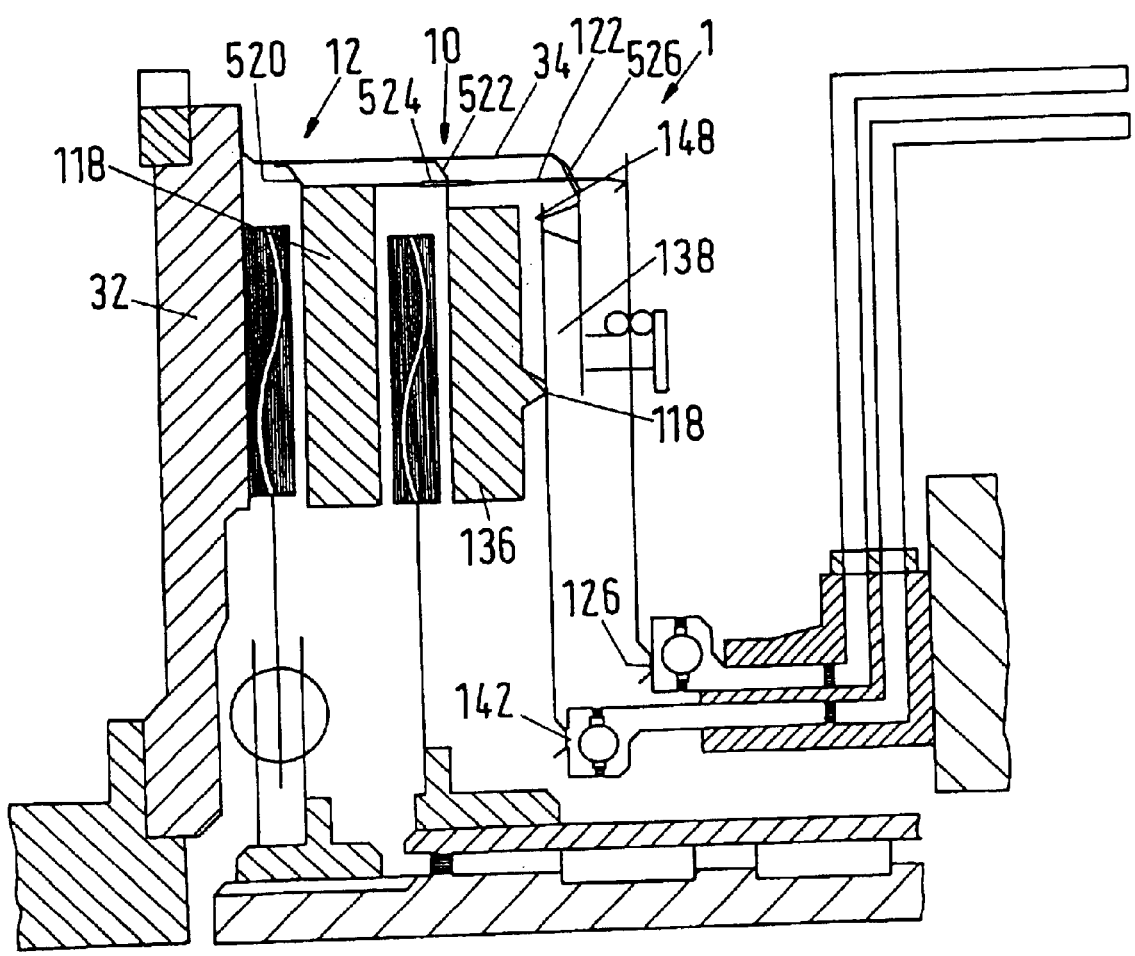
FIG. 15 shows a diagrammatic part sectional view of an eleventh embodiment of the invention given by way of example.

FIG. 15 shows an embodiment by way of example of a torque transfer device 1 according to the invention which corresponds substantially to a partial view of the embodiment illustrated in FIG. 2.

The embodiment according to FIG. 15 shows that the second contact pressure plate 118 of the second clutch device 12 is loaded by a spring device 520 which is supported on the clutch cover 34.

The first contact pressure plate 136 of the first clutch device 10 is loaded by a first spring device 522 which is likewise supported on the clutch cover 34.

The axial projection 122 has a full-length opening 524 through which the spring device 522 extends. The clutch cover 344 likewise has a full-length opening 526 through which the axial projection 122 extends.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of the sub-claims can form independent and proper inventions in respect of the prior art known on the priority date the applicant reserves the right to make them the subject of independent claims and partial declarations. They can also contain independent inventions which have a configuration independent of the subjects of the preceding sub-claims.

The embodiments are not to be regarded as a restriction of the invention. Rather within the scope of the present disclosure numerous modifications and amendments are possible, particularly those variations, elements and combinations and/or materials which e.g. through a combination or modification of individual features or elements or method steps described in connection with the general description and embodiments as well as claims and are contained in the drawings can be drawn on by the expert with a view to solving the problem posed by the invention and which through a combination of features lead to a new subject or new method steps or sequence of method steps, where they relate to manufacturing, test and work processes.

What is claimed is:

1. A torque transfer device comprising:
   a first clutch device actuated by a first hydraulic slave cylinder/piston device with a first slave piston;
   a second clutch device actuated by a second hydraulic slave cylinder/piston device with a second slave piston;

a hydraulic master cylinder/piston device with a master piston, and with an output port branching into a first conduit leading to the first hydraulic slave cylinder/piston device and a second conduit leading to the second hydraulic slave cylinder/piston device;

an electrical motor arranged to drive the hydraulic master cylinder/piston device;

a first valve device arranged in the first conduit to control a hydraulic pressure supplied to the first hydraulic slave cylinder/piston device; and a second valve device arranged in the second conduit to control a hydraulic pressure supplied to the second hydraulic slave cylinder/piston device;

wherein the first valve device and the second valve device are controlled electromagnetically, independent of each other, so that actuation of the first clutch device by the first hydraulic slave cylinder/piston device and actuation of the second clutch device by the second hydraulic slave cylinder/piston device are controlled independently of each other.

2. The torque transfer device of claim 1, wherein the first clutch device comprises a power shift clutch and the second clutch device comprises a start-up clutch.

3. The torque transfer device of claim 1, wherein the first clutch device is engaged by applying a compressive force.

4. The torque transfer device of claim 1, wherein the second clutch device is a self-holding clutch device.

5. The torque transfer device of claim 1, wherein the first and second clutch devices have a common clutch housing.

6. The torque transfer device of claim 1, further comprising a transmission device.

7. The torque transfer device of claim 1, further comprising at least one third clutch device.

8. The torque transfer device of claim 7, wherein the at least one third clutch device comprises a positive-locking claw clutch.

9. The torque transfer device of claim 6, wherein the transmission device has a plurality of gear wheels through which under predetermined conditions in different shift positions torque is transferred through different combinations of said gear wheels.

10. The torque transfer device of claim 6, wherein the transmission device comprises a first shaft and a second shaft, between which a plurality of transmission stages are arranged so that different transmission ratios can be set between the first shaft and the second shaft, wherein said transmission stages comprise a power shift transmission stage with a first gear wheel mounted on, and rotatable relative to, the first shaft, wherein said first gear wheel can be brought into rotationally locked engagement with the first shaft through the first clutch device, and wherein said first gear wheel engages directly or indirectly a second gear wheel rotationally secured on the second shaft; and said transmission stages further comprise shiftable gear stages, each of which has a free gear wheel mounted on, and rotatable relative to, one of the first and second shaft, wherein said free gear wheel can be brought into rotationally locked engagement with said one of the first and second shaft through a shift clutch device, and further comprises a fixed gear wheel rotationally secured on the other of said first and second shaft, and under predetermined conditions when the shift clutch device of one of the shiftable gear stages is in an engaged state, torque can be transferred between the first and second shaft through said one of the shiftable gear stages.

11. The torque transfer device of claim 6, wherein the transmission device is a power shift transmission which can be shifted under load into different gear stages with different transmission ratios.

12. The torque transfer device of claim 10, wherein the first clutch device is a power shift clutch device which is shifted into an engaged position when the transmission device is shifted from one to another of said shiftable gear stages.

13. The torque transfer device of claim 12, wherein while the transmission device is in process of being shifted from one to another of said shiftable gear stages, the first clutch device under predetermined conditions is shifted into an engaged position and enables torque transfer between the first and second shaft while all of the shift clutch devices are substantially in a disengaged position.

14. The torque transfer device of claim 1, wherein under said independent control of the first valve device and of the second valve device:

in a first control state the hydraulic master cylinder/piston device is connected to the first hydraulic slave cylinder/piston device and disconnected from the second hydraulic slave cylinder/piston device;

in a second control state the hydraulic master cylinder/piston device is connected to the second hydraulic slave cylinder/piston device and disconnected from the first hydraulic slave cylinder/piston device; and in a third control state the hydraulic master cylinder/piston device is disconnected from the first hydraulic slave cylinder/piston device as well as from the second hydraulic slave cylinder/piston device.

15. The torque transfer device of claim 1, wherein under predetermined conditions the electric motor drives the master piston.

16. The torque transfer device of claim 15, wherein the first clutch device has a first release lever device, and wherein under predetermined conditions the first slave piston applies a force to said first release lever device.

17. The torque transfer device of claim 15, wherein the second clutch device has a second release lever device, and wherein under predetermined conditions the second slave piston applies a force to said second release lever device.

18. The torque transfer device of claim 16, wherein the first clutch device comprises a first pressure plate, and wherein when the first hydraulic slave cylinder/piston device applies a compressive force to the first release lever device, the first release lever device exerts a compressive force on the first pressure plate.

19. The torque transfer device of claim 17, wherein the second clutch device comprises a second pressure plate, and wherein when the second hydraulic slave cylinder/piston device applies a compressive force to the second release lever device, the second release lever device exerts a pulling force on the second pressure plate.

20. The torque transfer device of claim 1, wherein the first clutch device comprises a first release lever device and a first pressure plate, and the second clutch device comprises a second release lever device and a second pressure plate, and wherein the first release lever device acts on the first pressure plate from the same side as the second release lever device acts on the second pressure plate.

21. The torque transfer device of claim 15, further comprising at least one spring device assisting the electric motor in driving the master piston.

22. The torque transfer device of claim 1, further comprising at least one volume compensating container.

23. The torque transfer device of claim 1, wherein the first and second valve devices together comprise at least one a/b-way valve device wherein a is an integer greater than 1, b is an integer greater than 1, and wherein a indicates a number of connections that can be made through the a/b-way valve device and b indicates a number of positions between which the a/b-way valve device can be shifted.

24. The torque transfer device of claim 23, wherein at least one connection of the at least one a/b-way valve device is connected to the first hydraulic slave cylinder/piston device through the first conduit.

25. The torque transfer device of claim 23, wherein at least one connection of the at least one a/b-way valve device is connected to the second hydraulic slave cylinder/piston device through the second conduit.

26. The torque transfer device of claim 23, wherein at least one connection of the at least one a/b-way valve device is connected to the master cylinder through at least one of the first and second conduits.

27. The torque transfer device of claim 22, wherein at least one connection of the at least one a/b-way valve device is connected to the volume compensating container.

28. The torque transfer device of claim 22, wherein the hydraulic master cylinder/piston device has at least one sniffing bore which is connected to the volume compensating container.

29. The torque transfer device of claim 21, wherein the at least one spring device exerts a force on the master piston.

30. The torque transfer device of claim 28, wherein the hydraulic master cylinder/piston device has a first chamber and a second chamber, and wherein in a first position of the master piston the snifting bore is connected to the first chamber, in a second position of the master piston the sniffing bore is closed off by the master piston, and in a third position of the master piston the snifting bore connected to the second chamber.

31. The torque transfer device of claim 2, wherein the first clutch device can be shifted into different shift positions and has a first input part as well as a first output part, wherein the first input part rotates relative to the first output part in at least one shift position of the first clutch device under predetermined conditions the second clutch device can be shifted into different shift positions and has a second input part and a second output part, wherein the second input part rotates relative to the second output part in at least one shift position of the second clutch device under predetermined conditions;

a first release lever device is arranged outside of, and under predetermined conditions rotates relative to, at least one of the first input part and the first output part; and a second release lever device is arranged outside of, and under predetermined conditions rotates relative to, at least one of the second input part and the second output part.

32. The torque transfer device of claim 31, wherein the first release lever device and the second release lever device are mounted radially outside of at least one of the first and second input and output parts.

33. The torque transfer device of claim 31, wherein the first clutch device comprises a first clutch disc rotationally locked to one of the first input part and the first output part, and wherein under predetermined conditions at least one of the first and second release lever devices swivels relative to the first clutch disc.

34. The torque transfer device of claim 31, wherein the second clutch device comprises a second clutch disc rotationally locked to one of the second input part and the second output part, and wherein under predetermined conditions at least one of the first and second release lever devices swivels relative to the second clutch disc.

35. The torque transfer device of claim 31, wherein each of the first and second release lever devices comprises a diaphragm spring device.

36. The torque transfer device of claim 31, wherein at least one of the first and second release lever devices has at least one axial projection which contacts a pressure plate.

37. The torque transfer device of claim 36, wherein the at least one axial projection bears against a diaphragm spring.

38. The torque transfer device of claim 36, wherein the axial projection extends axially past a clutch disc.

39. The torque transfer device of claim 36, wherein the axial projection extends through at least one opening in one of a clutch housing and a clutch cover.

40. The torque transfer device of claim 36, only one of the first and second clutch devices comprises the axial projection, and wherein the axial projection extends radially outside of the release lever device that belongs to the other of the first and second clutch devices two clutch devices.

41. The torque transfer device of claim 40, wherein the respective pressure plates of the first clutch device and the second clutch device have different outer diameters.

42. The torque transfer device of claim 41, wherein the axial projection extends radially outside of the pressure plate which has the smaller external diameter.

43. The torque transfer device of claim 41, wherein the axial projection extends substantially radially inside the pressure plate which has the larger outer diameter.

* * * * *